United States Patent
Hu et al.

(10) Patent No.: US 12,130,966 B2
(45) Date of Patent: Oct. 29, 2024

(54) FUNCTION ENABLING METHOD AND ELECTRONIC DEVICE

(71) Applicant: Huawei Technologies Co., Ltd., Shenzhen (CN)

(72) Inventors: Liang Hu, Shenzhen (CN); Jie Xu, Shanghai (CN); Xiaoying Cui, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/438,099

(22) PCT Filed: Mar. 6, 2020

(86) PCT No.: PCT/CN2020/078109
§ 371 (c)(1),
(2) Date: Sep. 10, 2021

(87) PCT Pub. No.: WO2020/182065
PCT Pub. Date: Sep. 17, 2020

(65) Prior Publication Data
US 2022/0253144 A1    Aug. 11, 2022

(30) Foreign Application Priority Data
Mar. 13, 2019    (CN) .......................... 201910190715.0

(51) Int. Cl.
*G06F 3/01*    (2006.01)
*G06F 21/32*    (2013.01)
(Continued)

(52) U.S. Cl.
CPC .............. *G06F 3/017* (2013.01); *G06F 21/32* (2013.01); *G06Q 20/3274* (2013.01); *G06V 40/168* (2022.01); *G06V 40/172* (2022.01)

(58) Field of Classification Search
CPC ...... G06V 10/20; G06V 40/20; G06V 40/172; G06V 40/1365; G06V 40/197
See application file for complete search history.

(56) References Cited

U.S. PATENT DOCUMENTS 8,560,004 B1 * 10/2013 Tsvetkov .............. G06F 1/3215
345/169
2012/0268372 A1    10/2012 Park et al.
(Continued)

FOREIGN PATENT DOCUMENTS

| CN | 105045503 A | 11/2015 |
| CN | 106250021 A | 12/2016 |

(Continued)

OTHER PUBLICATIONS

Mitra el at., Gesture Recognition: A Survey, IEEE Transactions on Systems, Man, and Cybernetics—Part C: Applications and Reviews, vol. 37, No. 3, May 2007, pp. 311-324.*

*Primary Examiner* — Guillermo M Rivera-Martinez
(74) *Attorney, Agent, or Firm* — Conley Rose, P.C.

(57) ABSTRACT

A shortcut function enabling method and an electronic device, where the electronic device collects an air gesture of a user using a camera, recognize the air gesture of the user, obtain a facial feature of the user, and verify whether the facial feature is a facial feature from the user or a stored facial feature. When face verification of the user succeeds and the air gesture is a preset air gesture, an application or a shortcut function is quickly enabled.

20 Claims, 32 Drawing Sheets

(51) Int. Cl.
*G06Q 20/32* (2012.01)
*G06V 40/16* (2022.01)

(56) References Cited

U.S. PATENT DOCUMENTS

| | | | |
|---|---|---|---|
| 2013/0015946 A1* | 1/2013 | Lau | G06V 40/172 |
| | | | 340/5.2 |
| 2013/0223696 A1* | 8/2013 | Azar | G06V 40/16 |
| | | | 382/118 |
| 2013/0278493 A1* | 10/2013 | Wei | G06F 3/005 |
| | | | 382/106 |
| 2013/0300662 A1* | 11/2013 | Liu | G06F 3/017 |
| | | | 345/158 |
| 2013/0342672 A1* | 12/2013 | Gray | H04W 12/06 |
| | | | 348/78 |
| 2014/0004834 A1* | 1/2014 | Mian | G06F 3/0488 |
| | | | 455/414.1 |
| 2014/0169641 A1* | 6/2014 | Lee | G06F 3/011 |
| | | | 382/116 |
| 2016/0054803 A1 | 2/2016 | Poupyrev | |
| 2016/0109954 A1* | 4/2016 | Harris | G06V 20/20 |
| | | | 345/156 |
| 2016/0259488 A1 | 9/2016 | Chan et al. | |
| 2016/0364600 A1* | 12/2016 | Shah | G06V 40/172 |
| 2018/0032997 A1* | 2/2018 | Gordon | G06Q 30/0269 |
| 2018/0314536 A1* | 11/2018 | Wang | G06Q 20/326 |
| 2021/0341702 A1 | 11/2021 | He et al. | |

FOREIGN PATENT DOCUMENTS

| | | | | |
|---|---|---|---|---|
| CN | 106778114 A | | 5/2017 | |
| CN | 106980527 A | | 7/2017 | |
| CN | 104679250 B | * | 9/2017 | |
| CN | 107395888 A | | 11/2017 | |
| CN | 108920922 A | * | 11/2018 | G06F 21/32 |
| CN | 108959857 A | | 12/2018 | |
| CN | 109379460 A | | 2/2019 | |
| CN | 110058777 A | | 7/2019 | |
| EP | 3855710 A1 | | 7/2021 | |
| WO | 2016201037 A1 | | 12/2016 | |
| WO | 2017020261 A1 | | 2/2017 | |
| WO | WO-2018226265 A1 | * | 12/2018 | G06F 18/00 |

* cited by examiner ly used by people, but many operation steps are required to open these applications or services each time. For example, to open a QR code of Alipay in a screen-off state, first light up and unlock a screen of a mobile phone, then find and open the Alipay application, and then tap the QR code function. The operation steps are very cumbersome.

FUNCTION ENABLING METHOD AND ELECTRONIC DEVICE

CROSS-REFERENCE TO RELATED APPLICATIONS

This is a U.S. National Stage of International Patent Application No. PCT/CN2020/078109 filed on Mar. 6, 2020, which claims priority to Chinese Patent Application No. 201910190715.0 filed on Mar. 13, 2019. Both of the aforementioned applications are hereby incorporated by reference in their entireties.

TECHNICAL FIELD

This application relates to the field of electronic technologies, and in particular, to a shortcut function enabling method and an electronic device.

BACKGROUND

With increasing popularity and development of electronic devices, there are increasingly more applications and services on an intelligent terminal. Some applications or services are frequently used by people, but many operation steps are required to open these applications or services each time. For example, to open a OR code of Alipay in a screen-off state, first light up and unlock a screen of a mobile phone, then find and open the Alipay application, and then tap the OR code function. The operation steps are very cumbersome.

Therefore, a method for enabling a shortcut function is required, to quickly open a payment function of an application.

SUMMARY

This application provides a shortcut function enabling method and an electronic device. In the method, an application or a function of an application can be quickly enabled, to simplify operations and improve user experience.

According to a first aspect, a shortcut function enabling method is provided and is applied to an electronic device. The electronic device stores a preset gesture and facial feature information of a first user, the preset gesture is used to enable a first function of the electronic device, and the preset gesture is a gesture at a preset distance from the electronic device. The method includes: obtaining information about a first gesture; determining, based on the information about the first gesture, whether the first gesture is the preset gesture used to enable the first function; obtaining facial feature information of a second user; determining, based on the facial feature information of the second user, whether the second user is the first user; and enabling the first function when it is determined that the first gesture is the preset gesture and the second user is the first user.

According to the foregoing technical solution, a gesture of a user may be collected by using a camera of the electronic device, and the gesture of the user may be recognized. In addition, a facial feature of the user is obtained, to verify whether the obtained facial feature is a facial feature entered by a user or a stored facial feature. When facial verification of the user succeeds and the gesture is a preset gesture used to enable a Money function of WeChat, the Money function of WeChat is quickly enabled, and an interface of the Money function of WeChat is directly displayed. In the method, both air gesture verification and facial feature verification of a user are used, to quickly enable a function of an application. This can simplify operations, resolve a problem that identity recognition cannot be performed by using an air gesture, avoid a problem that an air gesture is prone to cause an accidental touch, and improve user experience.

It should be understood that the air gesture in this application includes but is not limited to various static gestures and dynamic gestures enumerated in the embodiments of this application. For example, the static gesture may be an OK gesture, a V gesture, a palm gesture, or the like, and the dynamic gesture may be different types of gestures such as waving up and down, waving left and right, pressing, or drawing a Z. For a same air gesture, operation behavior of different users may be slightly different, but a feature of the gesture is basically unchanged. It may be determined, by recognizing the feature of the gesture, whether the gesture is a preset gesture used to enable a shortcut function.

It should be further understood that each shortcut function may correspond to one preset gesture. For example, in the embodiments of this application, a gesture of extending five fingers and waving left and right is the preset gesture used to enable the Money function of WeChat. In this application, a correspondence between a gesture and a shortcut function and a method for setting a gesture and a shortcut function are not limited.

Verification on facial feature information in this application means that the electronic device performs verification by comparing facial image information that belongs to a user and that is collected by using the camera or another sensor with stored facial feature information previously entered by a user, to determine whether the users are a same person. If a verification result is that the users are a same person, the verification succeeds. If a verification result is that the users are not a same person, the verification fails.

It should be understood that a face identity verification method in this application may be performing verification by using a different method such as deep learning in the conventional technology. This is not limited in this application.

It should be further understood that, when detecting an air gesture and a facial feature, the electronic device needs to perform air gesture verification and facial verification in parallel. A sequence of performing the air gesture verification and the facial feature information verification is not limited in this application. In an actual processing process, a part of a face may be blocked when an air gesture is made, and this affects facial verification. Therefore, the parallel verification herein means that if a corresponding air gesture is detected within a specific time interval after a facial feature is detected for verification, it indicates that the verification succeeds. Alternatively, the parallel verification herein means that if facial verification succeeds within a specific time interval after an air gesture is detected, it indicates that the verification succeeds.

In addition, enabling the first function in this application may be invoking a corresponding function. The invoked first function may be an application such as WeChat and TikTok installed by the user. Alternatively, the invoked function may be a service or a shortcut function of an application installed by the user, for example, a WeChat QR code, an Alipay QR code, or a home navigation route of a map. Alternatively, the invoked function may be some system level functions such as a voice assistant. In addition, the application may be an application specified by a system of the electronic device, or may be a user-defined application. This is not limited in this application.

With reference to the first aspect, in some implementations of the first aspect, the enabling the first function when it is determined that the first gesture is the preset gesture and the second user is the first user includes: enabling the first function when it is determined that the first gesture is the preset gesture and it is determined, within first preset duration, that the second user is the first user; or enabling the first function when it is determined that the second user is the first user and it is determined, within second preset duration, that the first gesture is the preset gesture.

It should be understood that the first preset duration and the second preset duration herein may be same duration, or may be different duration. This is not limited in this application.

It should be further understood that, when detecting an air gesture and a facial feature, the electronic device needs to perform air gesture verification and facial verification in parallel. A sequence of performing the air gesture verification and the facial feature information verification is not limited in this application. In an actual processing process, a part of a face may be blocked when an air gesture is made, and this affects facial verification. Therefore, the parallel verification herein may mean that if a corresponding air gesture is detected within a specific time interval after a facial feature is detected for verification, it indicates that the verification succeeds. Alternatively, the parallel verification herein means that if facial verification succeeds within a specific time interval after an air gesture is detected, it indicates that the verification succeeds.

According to the foregoing technical solution, in a process of preset gesture verification and facial information verification, a limitation of preset duration is used, that is, a time interval between the preset gesture verification and the facial information verification is limited, so that the first function can be used more securely. For example, a user A may unlock the electronic device through facial verification, but the electronic device is always unlocked within 3 minutes. If a user B makes an air gesture, the interface of the Money function of WeChat is displayed after gesture is verified. In this solution, the preset duration is limited. For example, the preset duration is 30 seconds. When the user A unlocks the electronic device through facial verification, no air gesture is detected within 30 seconds. The Money function of WeChat is not enabled even if an air gesture is verified after 30 seconds, and the Money function of WeChat is used more securely.

With reference to the first aspect and the foregoing implementations, in some implementations of the first aspect, the method further includes: skipping enabling the first function when it is determined that the first gesture is the preset gesture and the second user is not the first user or when it is determined that the first gesture is not the preset gesture and the second user is the first user.

With reference to the first aspect and the foregoing implementations, in some implementations of the first aspect, the electronic device is in any one of the following states: the electronic device is in a lock screen state; or the electronic device is in an unlock screen state.

With reference to the first aspect and the foregoing implementations, in some implementations of the first aspect, when the electronic device is in the lock screen state, if the electronic device determines that the first gesture is the preset gesture and the second user is not the first user, the electronic device remains in the lock screen state; or if the electronic device determines that the first gesture is not the preset gesture and the second user is the first user, the electronic device switches to the unlock screen state.

With reference to the first aspect and the foregoing implementations, in some implementations of the first aspect, the determining, based on the facial feature information of the second user, that the second user is the first user includes: determining, based on a degree of matching between the facial feature information of the second user and the facial feature information of the first user, that the second user is the first user.

With reference to the first aspect and the foregoing implementations, in some implementations of the first aspect, the determining, based on a degree of matching between the facial feature information of the second user and the facial feature information of the first user, that the second user is the first user includes: when the degree of matching between the facial feature information of the second user and the facial feature information of the first user is greater than or equal to a first threshold, determining that the second user is the first user.

In a special case, the electronic device may perform misjudgment. For example, for twin sisters, the electronic device may store a facial feature of the elder sister, that is, the elder sister is the first user. However, the younger sister is the second user, and facial information of the younger sister may be verified, and it is determined that the younger sister is the elder sister. This case occurs in a condition that facial feature information of the twin sisters is extremely similar, and also falls within the protection scope of this application.

With reference to the first aspect and the foregoing implementations, in some implementations of the first aspect, the obtaining information about a first gesture includes: obtaining the information about the first gesture by using a camera of the electronic device; or obtaining the information about the first gesture by using an infrared sensor of the electronic device; or obtaining the information about the first gesture by using a 3D sensor of the electronic device.

With reference to the first aspect and the foregoing implementations, in some implementations of the first aspect, the obtaining facial feature information of a second user includes: obtaining the facial feature information of the second user by using the camera of the electronic device; or obtaining the facial feature information of the second user by using the 3D sensor of the electronic device.

With reference to the first aspect and the foregoing implementations, in some implementations of the first aspect, the enabling the first function when it is determined that the first gesture is the preset gesture and the second user is the first user includes: displaying an interface of the first function when it is determined that the first gesture is the preset gesture and the second user is the first user.

According to a second aspect, an electronic device is provided, including one or more processors; one or more memories, configured to store a preset gesture and facial feature information of a first user, where the preset gesture is used to enable a first function of the electronic device, and the preset gesture is a gesture at a preset distance from the electronic device; a plurality of applications; and one or more programs, where the one or more programs are stored in the memory, and when the one or more programs are executed by the processor, the electronic device is enabled to perform the following steps: obtaining information about a first gesture; determining, based on the information about the first gesture, whether the first gesture is the preset gesture used to enable the first function; obtaining facial feature information of a second user; determining, based on the facial feature information of the second user, whether the second user is the first user; and enabling the first function when it is determined that the first gesture is the preset gesture and the second user is the first user.

With reference to the second aspect, in some implementations of the second aspect, when the one or more programs are executed by the processor, the electronic device performs the following step: enabling the first function when it is determined that the first gesture is the preset gesture and it is determined, within first preset duration, that the second user is the first user; or enabling the first function when it is determined that the second user is the first user and it is determined, within second preset duration, that the first gesture is the preset gesture.

With reference to the second aspect and the foregoing implementations, in some implementations of the second aspect, when the one or more programs are executed by the processor, the electronic device is enabled to perform the following step: skipping enabling the first function when it is determined that the first gesture is the preset gesture and the second user is not the first user or when it is determined that the first gesture is not the preset gesture and the second user is the first user.

With reference to the second aspect and the foregoing implementations, in some implementations of the second aspect, the electronic device is in any one of the following states: the electronic device is in a lock screen state; or the electronic device is in an unlock screen state.

With reference to the second aspect and the foregoing implementations, in some implementations of the second aspect, when the electronic device is in the lock screen state, if the electronic device determines that the first gesture is the preset gesture and the second user is not the first user, the electronic device remains in the lock screen state; or if the electronic device determines that the first gesture is not the preset gesture and the second user is the first user, the electronic device switches to the unlock screen state.

With reference to the second aspect and the foregoing implementations, in some implementations of the second aspect, when the one or more programs are executed by the processor, the electronic device is enabled to perform the following step: determining, based on a degree of matching between the facial feature information of the second user and the facial feature information of the first user, that the second user is the first user.

With reference to the second aspect and the foregoing implementations, in some implementations of the second aspect, when the one or more programs are executed by the processor, the electronic device is enabled to perform the following step: when the degree of matching between the facial feature information of the second user and the facial feature information of the first user is greater than or equal to a first threshold, determining that the second user is the first user.

With reference to the second aspect and the foregoing implementations, in some implementations of the second aspect, the electronic device further includes a camera, an infrared sensor, or a 3D sensor. When the one or more programs are executed by the processor, the electronic device is enabled to perform the following step: obtaining the information about the first gesture by using the camera of the electronic device; or obtaining the information about the first gesture by using the infrared sensor of the electronic device; or obtaining the information about the first gesture by using the 3D sensor of the electronic device.

With reference to the second aspect and the foregoing implementations, in some implementations of the second aspect, the electronic device further includes the camera or the 3D sensor. When the one or more programs are executed by the processor, the electronic device is enabled to perform the following step: obtaining the facial feature information of the second user by using the camera of the electronic device; or obtaining the facial feature information of the second user by using the 3D sensor of the electronic device.

With reference to the second aspect and the foregoing implementations, in some implementations of the second aspect, when the one or more programs are executed by the processor, the electronic device is enabled to perform the following step: displaying an interface of the first function when it is determined that the first gesture is the preset gesture and the second user is the first user.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function, for example, a display module or unit, a detection module or unit, or a processing module or unit.

According to a fourth aspect, this application provides an electronic device, including a touchscreen. The touchscreen includes a touch-sensitive surface, a display, a camera, one or more processors, one or more memories, a plurality of applications, and one or more computer programs. The one or more computer programs are stored in the memory, and the one or more computer programs include instructions. When the instructions are executed by the one or more processors, the electronic device is enabled to perform the shortcut function enabling method according to any possible implementation of any one of the foregoing aspects.

According to a fifth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the shortcut function enabling method according to any possible implementation of any one of the foregoing aspects.

According to a sixth aspect, this application provides a computer storage medium, including computer instructions. When the computer instructions are run on an electronic device, the electronic device is enabled to perform the shortcut function enabling method according to any possible implementation of any one of the foregoing aspects.

According to a seventh aspect, this application provides a computer program product. When the computer program product is run on an electronic device, the electronic device is enabled to perform the shortcut function enabling method according to any possible implementation of any one of the foregoing aspects.

DESCRIPTION OF EMBODIMENTS

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions of the embodiments of this application, "a plurality of" means two or more.

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise stated, "a plurality of" means two or more than two.

The embodiments of this application provide a shortcut function enabling method. The method may be applied to an electronic device. Alternatively, the method may be applied to an independent application, and the application may implement the shortcut function enabling method in this application. The electronic device recognizes an air gesture of a user. In addition, while detecting the air gesture of the user, the electronic device performs verification on facial information, and determines, based on the air gesture and the facial feature verification, whether to enable a shortcut function of an application. In the method, enabling of a function of an application, identity authentication, and the like can be quickly completed, so that a user can enable a function of an application more quickly and conveniently, security of the application is ensured, and user experience is improved.

The method for rereading a word or a sentence in a video provided in the embodiments of this application may be applied to an electronic device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Figure 1:
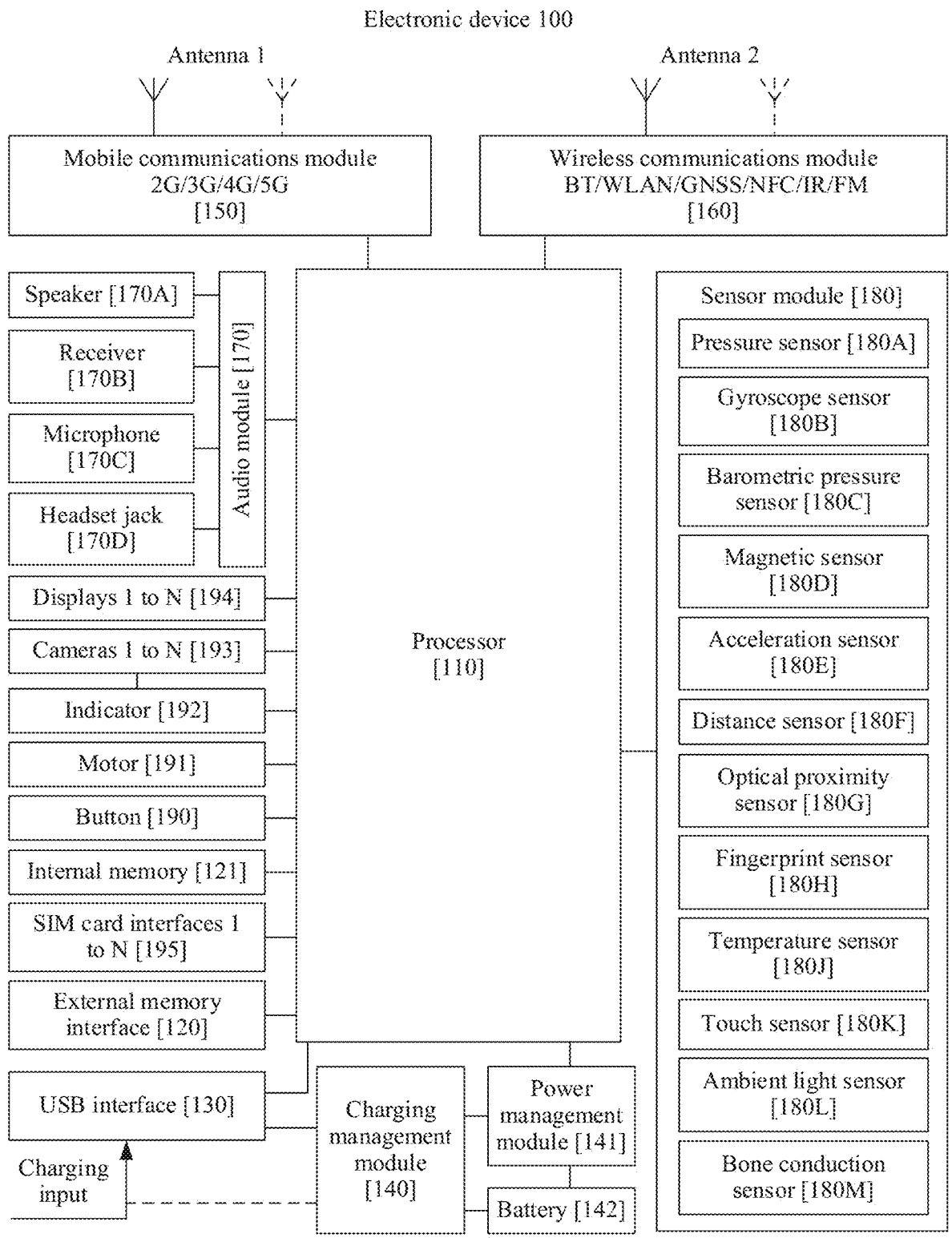
FIG. 1 is a schematic diagram of a hardware structure of an electronic device according to an embodiment of this application.

For example, FIG. 1 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150 a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a time sequence signal, to control to read instructions and execute instructions.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement the function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is all interface that complies with a USB standard specification, and may be specifically a mini USB interface, a micro USB interface, a USB Type-C interface, or the like. The USB interface 130 may be configured to connect to the charger to charge the electronic device 100, may be configured to transmit data between the electronic device 100 and a peripheral device, or may be configured to connect to a headset to play audio by using the headset. Alternatively, the interface may be configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a timing switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrated into at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The, ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

For example, in this application, a gesture of a user may be collected by using the camera of the electronic device, and change information of the gesture is transferred to the processor 110. The processor 110 recognizes the gesture of the user. In addition, the camera may obtain a facial feature of the user, and transfer information about the collected facial feature to the processor 110, and the processor 110 determines whether the obtained facial feature is a facial feature entered by the user or a saved facial feature. When facial verification of the user succeeds and the gesture is a preset gesture used to enable an application or a function of an application, the application or the function is quickly enabled.

The digit signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code, and the executable program code includes an instruction. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending a voice message, the user may make a sound near the microphone 170C by the mouth of the user, to input the sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce a noise, identify a sound source, implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects a strength of the touch operation based on the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messages application icon, an instruction for viewing an SMS message is executed. When a touch operation whose touch operation intensity is greater than or equal to the first pressure threshold is performed on a messages application icon, an instruction for creating an SMS message is executed.

The gyro sensor 180B may be configured to determine a motion posture of the electronic device 100. In some embodiments, an angular velocity of the electronic device 100 around three axes (namely, axes x, y and z) may be determined by using the gyro sensor 180B. The gyro sensor 180B may be configured to implement image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on an atmospheric pressure value obtained by the barometric pressure sensor 180C through measurement, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the clamshell is set based on a detected opening or closing state of the flip cover or a detected opening or closing state of the clamshell.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off a screen to save power. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

For example, in this application, as long as a hand or a face of a user appears around the electronic device, the light sensor 180F may detect a light change, and the light sensor may transfer information about the light change to the processor 110. The processor may control to enable a collection function of the camera, and start to trigger detection and recognition of an air gesture by the camera.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of the processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation acting on or near the touch sensor 180K. The touch sensor may transfer a detected touch operation to the application processor, to determine a type of a touch event. The display 194 may provide a visual output related to the touch operation. In some other embodiments, the touch sensor 180K may alternatively be disposed on a surface of the electronic device 100, in a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset, to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 can support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be of a same type or of different types. The SIM card interface 195 may further be compatible with different types of SIM cards. The SIM card interface 195 may also be compatible with the external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
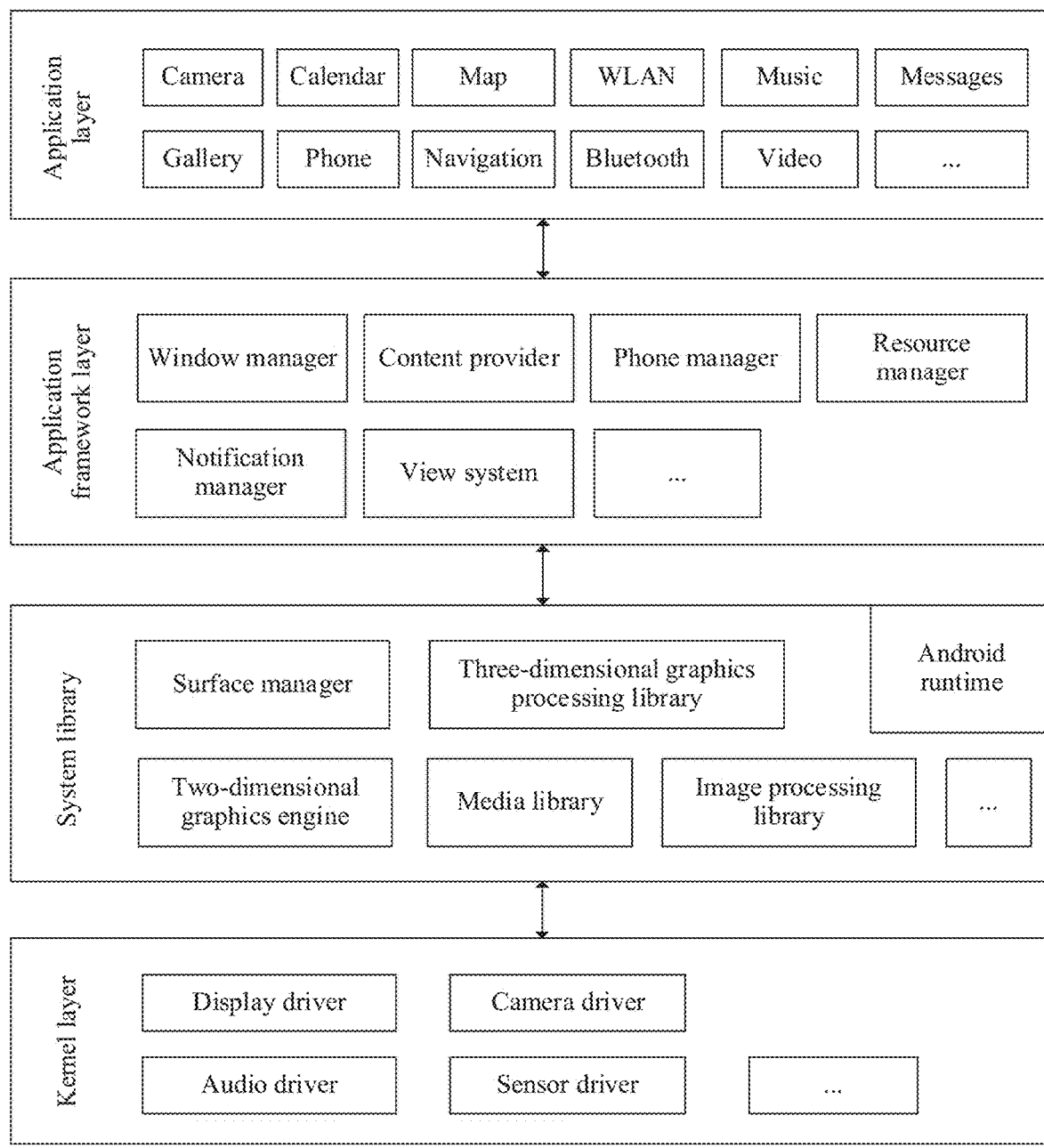
FIG. 2 is a schematic diagram of a software structure of an electronic device according to an embodiment of this application.

FIG. 2 is a block diagram of the software structure of the electronic device 100 according to this embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communications function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and managing the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media libraries), a three-dimensional graphics processing library (for example, OpenGL ES), a 2D graphics engine (for example, SGL), and the like.

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 1 and FIG. 2 is used as an example to describe in detail, with reference to the accompanying drawings and application scenarios, the shortcut function enabling method provided in the embodiments of this application.

Figure 3A:
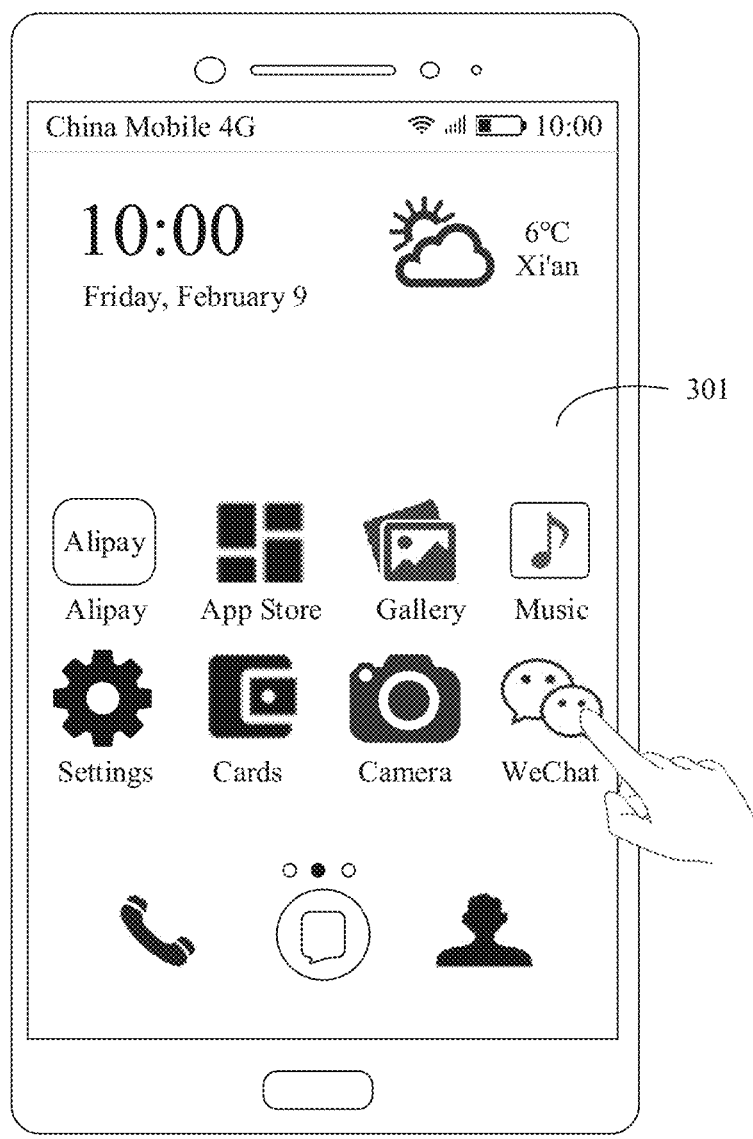
FIG. 3(a) to FIG. 3(d) are schematic diagrams of graphical user interfaces for enabling a payment function.

As described in the background, there are increasingly more applications and service types on electronic devices. When an application on an electronic device needs to be quickly enabled, for example, when a Money function of WeChat needs to be enabled, FIG. 3(a) to FIG. 3(d) are several schematic diagrams of graphical user interfaces (graphical user interface, GUI) for enabling a payment function in the conventional technology. A mobile phone is used as the electronic device. FIG. 3(a) shows currently output interface content 301 that is displayed by a screen display system of the mobile phone in an unlock screen state of the mobile phone. The interface content 301 is a home screen of the mobile phone. The interface content 301 displays a plurality of third-party applications (application, App), such as Alipay, Task Card Store, Album, Music, Card Packet, Settings, Camera, and WeChat.

Figure 3B:
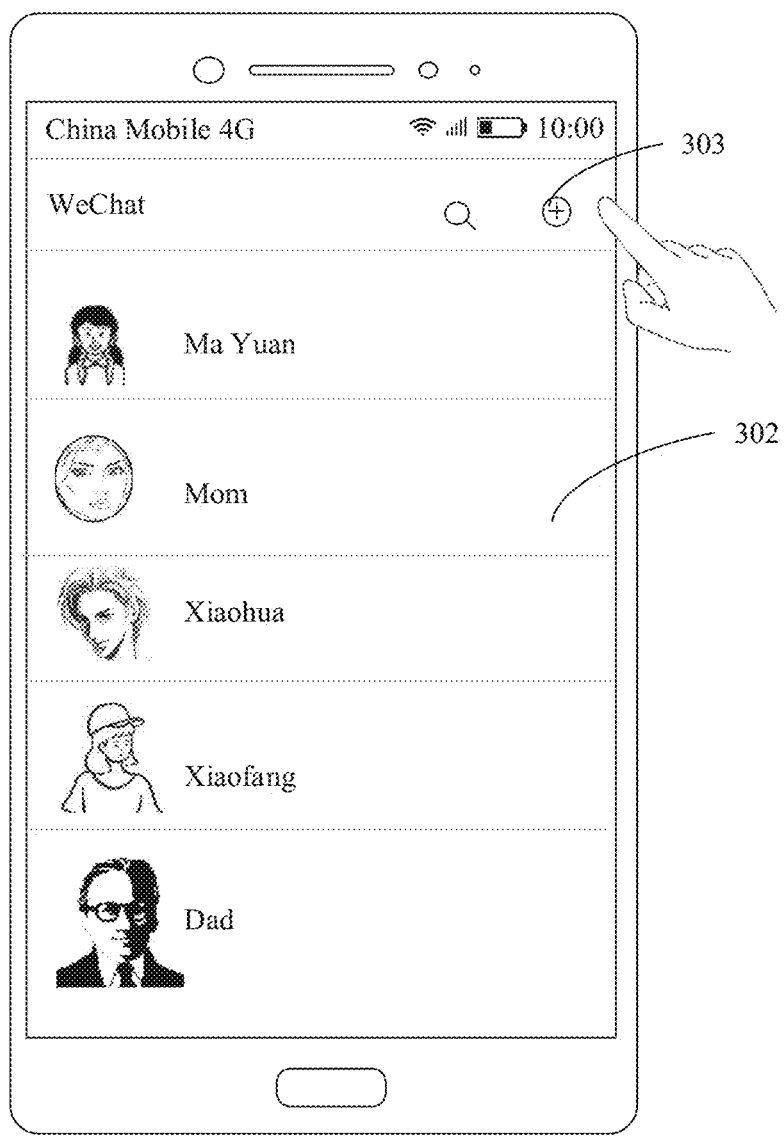
Figure 3C:
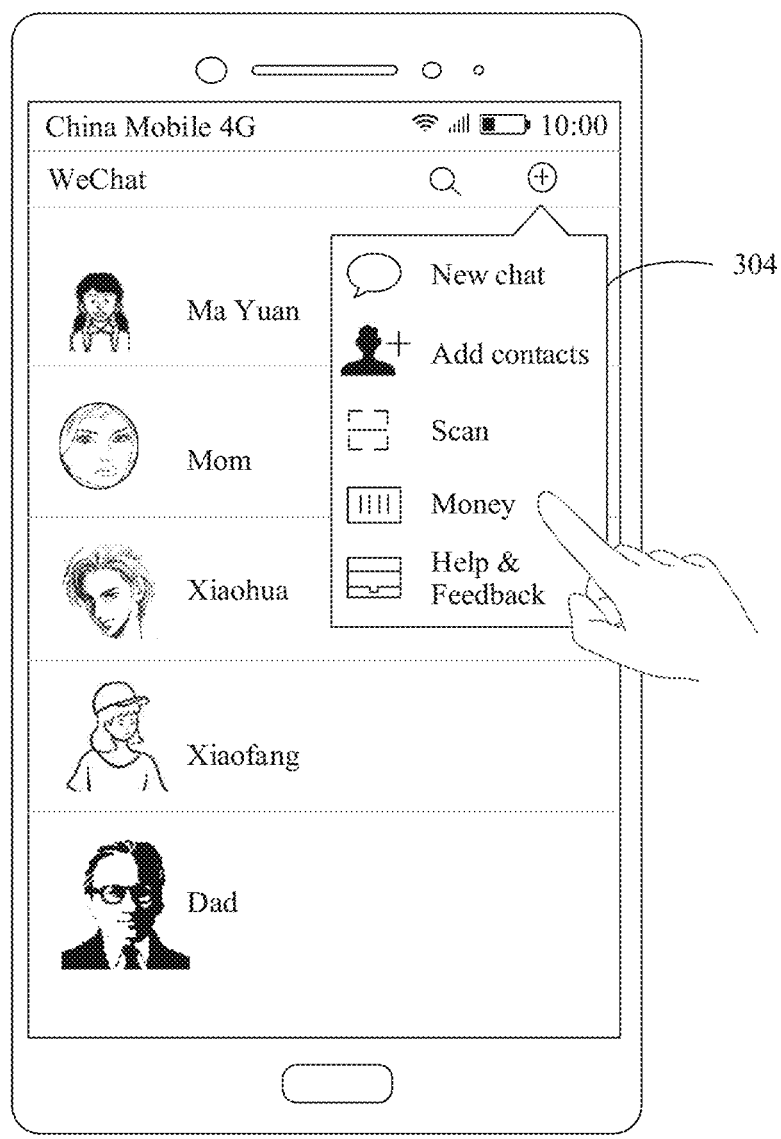
Figure 3D:
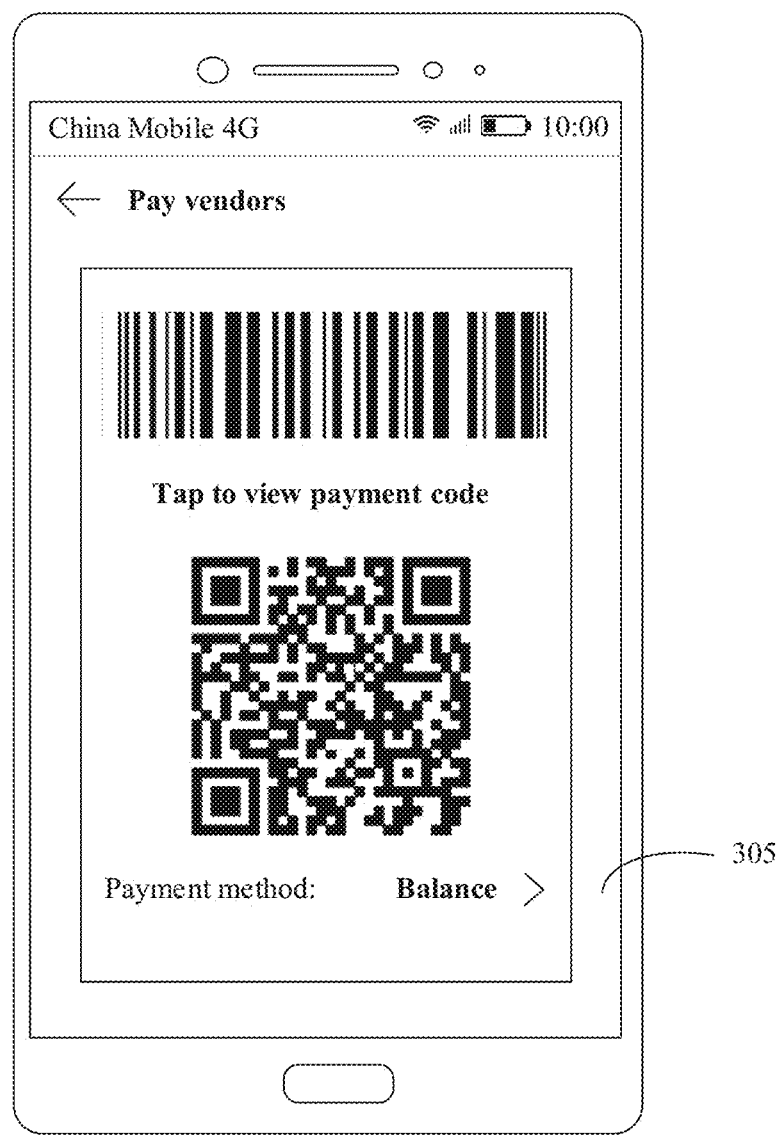

A user taps a WeChat application icon in the interface 301, and the electronic device displays a WeChat main interface 302 shown in FIG. 3(b). The WeChat main interface 302 includes a plurality of dialog lists and a plurality of function controls, for example, a search control and an add control 303. The user taps the add control 303 in the WeChat main interface 302, and the electronic device displays a selection box 304, where the selection box 304 includes an option of the Money function. The user taps the option of the Money function, and the electronic device may display the interface 305 of the Money function, and may perform payment by using a payment QR code or bar code. However, there are many operation steps for enabling the payment function, and the procedure is complex.

Figure 4A:
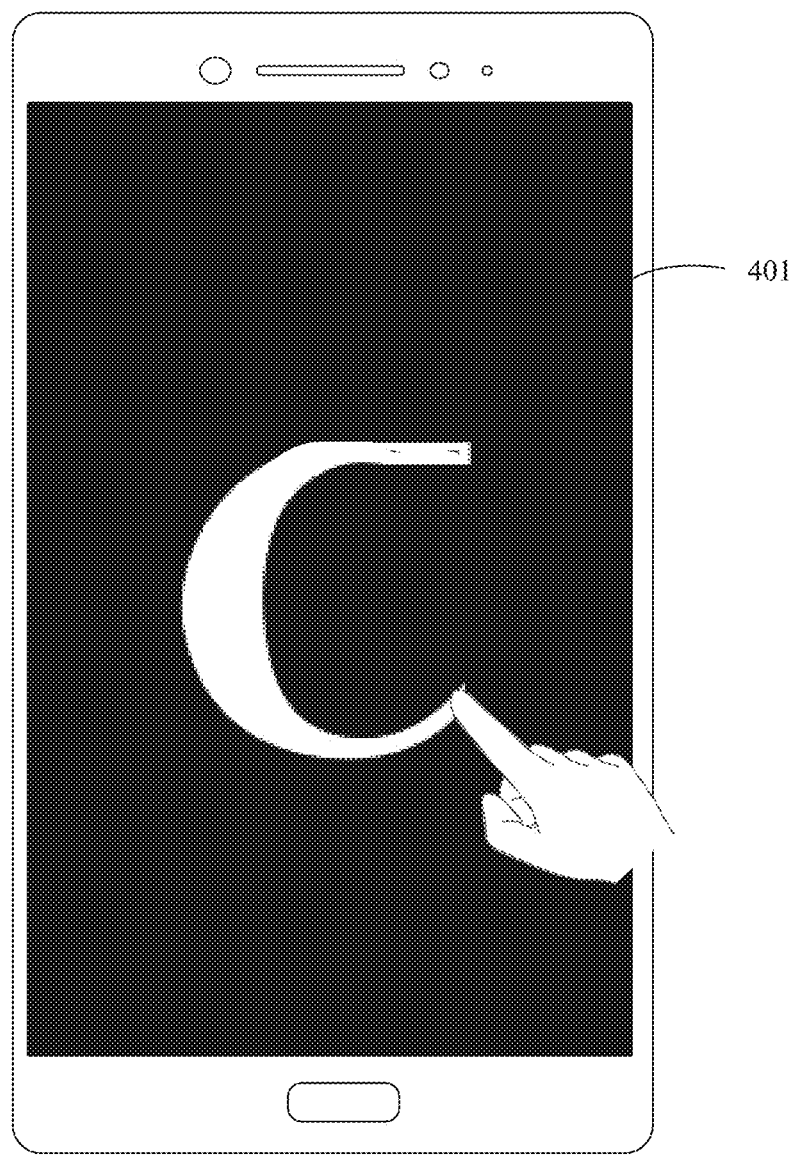
FIG. 4(a) and FIG. 4(b) are schematic diagrams of other graphical user interfaces for enabling a payment function.
Figure 4B:
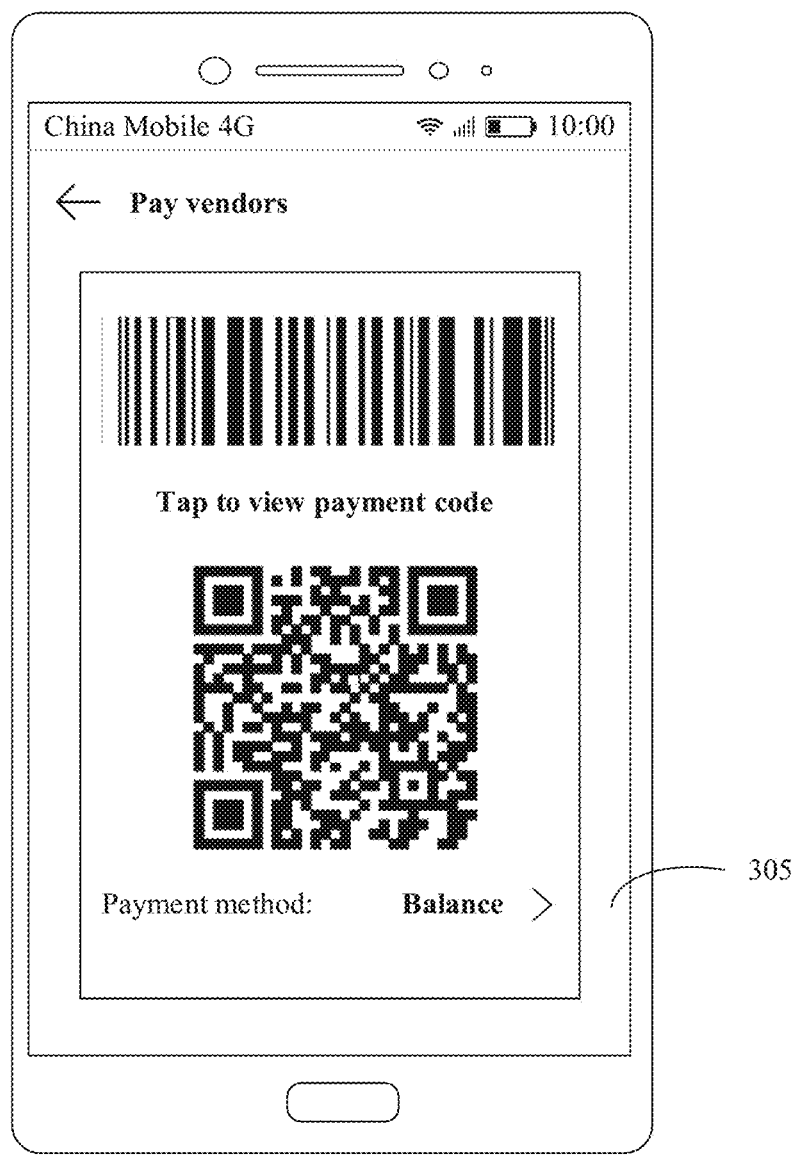

In another implementation, the electronic device may identify a specific touch operation performed by the user on the screen by using a hand or a knuckle, so as to quickly enter an application. FIG. 4(a) and FIG. 4(b) are other schematic diagrams for enabling a payment function. The user may draw a specific shape in a screen-off interface 401 in a screen-off state shown in FIG. 4(a) by using a finger or a knuckle. For example, the user may draw a C on the screen by using a hand or a knuckle, to enable the Money function of WeChat, and an interface 305 of the Money function shown in FIG. 4(b) is displayed.

When an application is quickly enabled by using a touch gesture on the screen of the electronic device, a system-level touch gesture may conflict with a touch gesture of a third-party application. In addition, a user's touch gesture on an external screen is prone to cause an accidental touch. In addition, when a third-party application or a function of a third-party application is quickly enabled by using a touch gesture, identity verification is not convenient, and this reduces security of using the third-party application.

In another implementation, a third-party application or a function of a third-party application may be quickly enabled by using a physical button. For example, the user may tap a physical button, tap a physical button for a plurality of times, or tap a physical button for a long period of time, to trigger a third-party application or a function of a third-party application. However, a service life of a physical button of the electronic device is limited, and a quantity of taps or a quantity of presses that the physical button can bear is also limited. If a physical button undertakes too many functions, complexity of interaction between the user and the electronic device may be increased. If a quantity of additional physical buttons is increased, hardware costs are increased. In addition, when the electronic device is placed in a bag or pocket, there is a risk of accidental touches of the physical button.

Therefore, this application provides a shortcut function enabling method. The electronic device recognizes an air gesture of a user. When detecting the air gesture of the user, the electronic device performs verification on facial information, and determines, based on the air gesture and facial feature verification, whether to enable a shortcut function of an application. In the method, enabling of a function of an application, identity authentication, and the like can be quickly completed, so that the user can enable the function of the application more quickly and conveniently, security of the application is ensured, and user experience is improved.

It should be understood that enabling the shortcut function herein may be invoking a corresponding function. The invoked function may be an application such as WeChat and TikTok installed by the user. Alternatively, the invoked function may be a service or a shortcut function of an application installed by the user, for example, a WeChat QR code, an Alipay QR code, or a home navigation route of a map. Alternatively, the invoked function may be some system level functions such as a voice assistant. In addition, the application may be an application specified by a system of the electronic device, or may be a user-defined application. This is not limited in this application.

It should be further understood that, in this application, the air gesture is a gesture, a movement change of a hand, or the like that is made by the user when the hand does not touch a screen of the electronic device, but is at a specific distance from the screen of the electronic device. The specific distance between the hand of the user and the screen of the electronic device herein may be a preset distance, and the distance is determined based on a camera, a sensor, or the like that collects the air gesture.

For example, when the electronic device collects a gesture of the user by using the camera, the preset distance is 10 centimeters to 100 centimeters. If a distance is less than 10 centimeters, the hand of the user is too close to the camera, and a collected gesture of the user may be incomplete. If a distance is greater than 100 centimeters, the hand of the user is too far away from the camera, a collected gesture of the user may be too small, and accuracy of determining the air gesture by the electronic device is reduced. Therefore, integrity of a collected air gesture and accuracy of determining the air gesture can be ensured within a range of the preset distance.

Alternatively, when the electronic device collects a gesture of the user by using the 3D sensor, the preset distance is 10 centimeters to 100 centimeters. In a 3D sensor technology, a target is detected by using components such as an infrared light source, an optical component, and an infrared sensor. If a distance is less than 10 centimeters, the hand of the user is too close to the camera, and a detected gesture of the user may be incomplete. If a distance is greater than 100 centimeters, the hand of the user is too far away from the sensor, sensitivity of the sensor is reduced, and accuracy of determining the air gesture by the electronic device is reduced. Therefore, integrity of a collected air gesture and accuracy of determining the air gesture can be ensured within a range of the preset distance.

Specifically, in a process of collecting an air gesture, the electronic device may collect the air gesture by using a device such as the camera or the 3D sensor. For example, the electronic device collects a shape of a user's hand and movement information of the hand by using the camera to recognize the air gesture, so as to map the air gesture to a corresponding operation, and determines whether a shortcut function of an application can be enabled.

In addition, in the process of collecting an air gesture, a frame rate at which the electronic device collects the air gesture may be a fixed frame rate. For example, the camera collects the air gesture of the user. The electronic device may collect the air gesture of the user 10 times per second. Alternatively, to reduce power consumption of the electronic device, the electronic device may collect the air gesture by using the camera at frame rates of different frame rate levels. For example, when no hand appears in a collection range of the camera, the camera performs collection at a first frame rate, where the first frame rate may be 10 frames per second. When detecting that a hand appears in the collection range of the camera, the camera performs collection at a second frame rate, where the second frame rate may be 60 frames per second. Collection is performed at frame rates of different levels, so that real-time performance and accuracy of air gesture collection can be improved, and power consumption of the electronic device can also be reduced. It should be understood that the frame rates of the different levels are not limited in this application.

Figure 5:
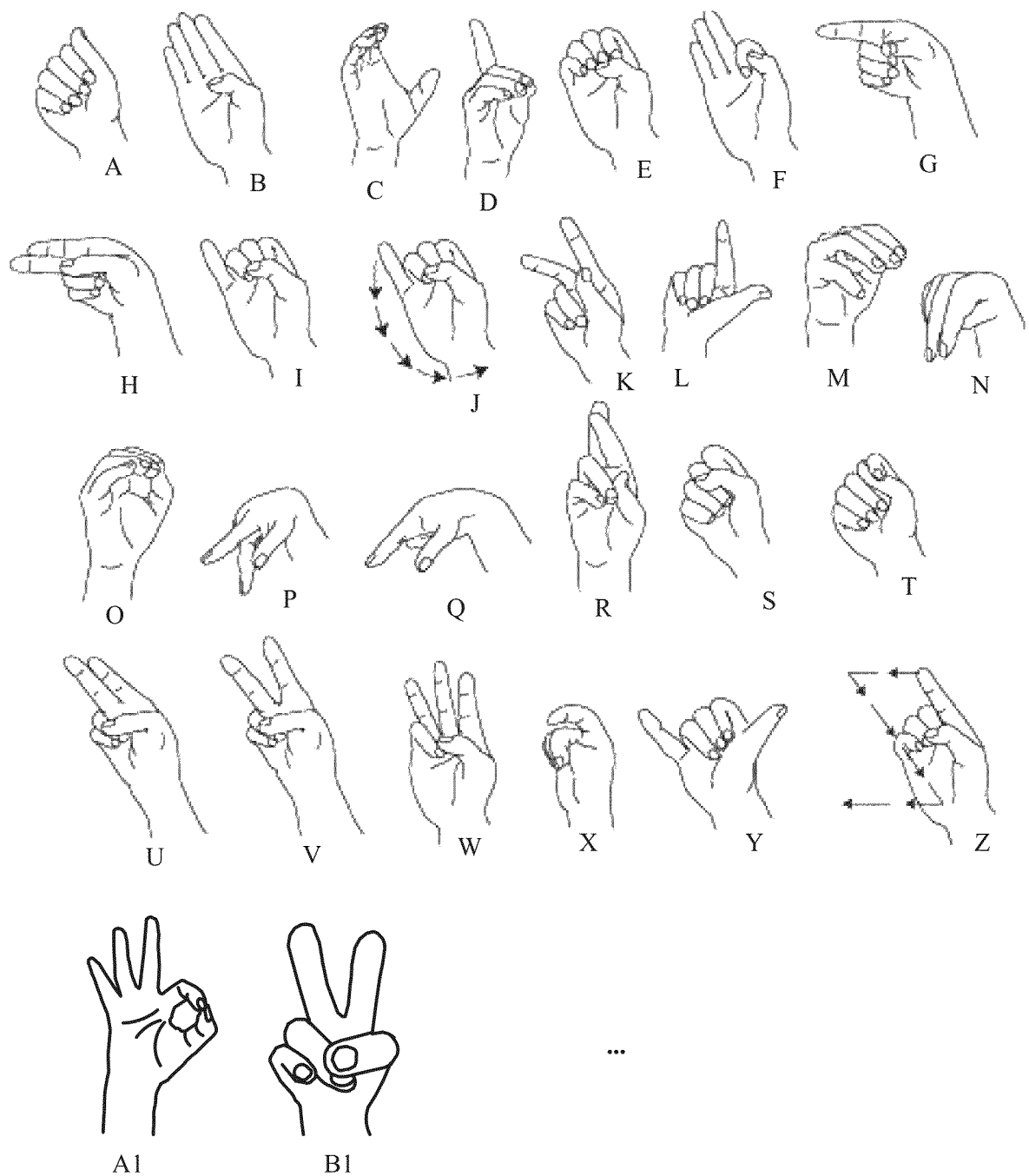
FIG. 5 is a schematic diagram of a plurality of possible gestures according to an embodiment of this application.

FIG. 5 is a schematic diagram of a plurality of possible gestures according to an embodiment of this application. Specifically, the air gesture may be classified into a static gesture and a dynamic gesture. The static gesture is a gesture of a hand at a moment, for example, a case in which fingers are bent or folded, such as a four-finger extending gesture shown in B, a C gesture shown in C, an OK gesture shown in A1, a V gesture shown in B1 in FIG. 5. Examples are not provided one by one herein.

The dynamic gesture is a movement status of a hand in a period of time, including a change of a movement direction of the hand, a movement speed of the hand, and a finger in a period of time, for example, a waving gesture, a fisting gesture shown in A, and a gesture of drawing a Z by a finger shown in Z. Examples are not provided one by one herein. It should be understood that the period of time herein may be preset duration, for example, 3 seconds. When the user does not change a movement direction, a movement speed, or a finger of the hand within 3 seconds, no dynamic gesture of the user is detected within the 3 seconds.

It should be further understood that the "air gesture" in this application is not limited. For example, the air gesture is not limited to the enumerated static gestures, the enumerated dynamic gestures, or any possible gesture in FIG. 5.

Figure 6:
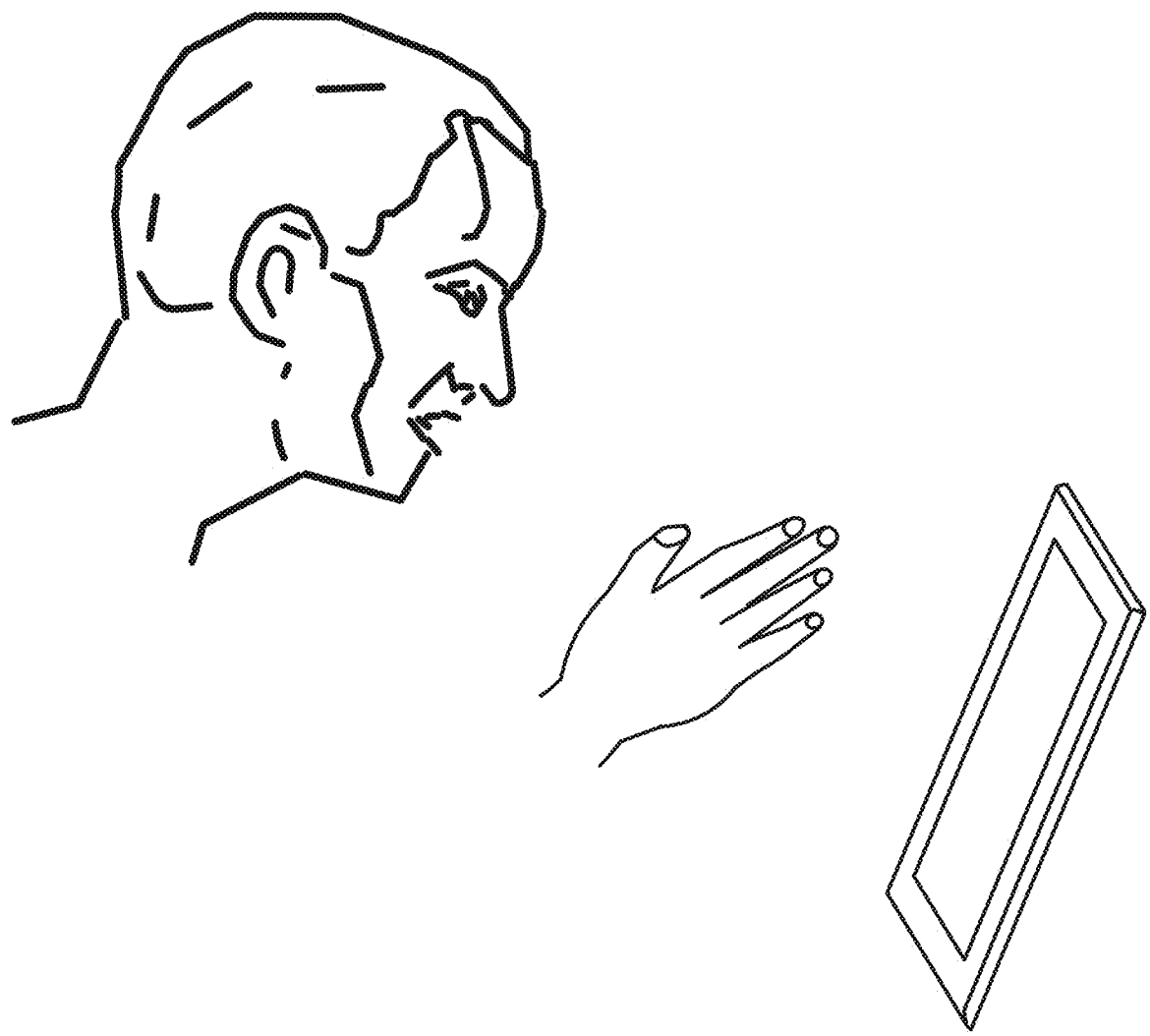
FIG. 6 is a schematic diagram of locations of a user and an electronic device in an air gesture recognition process according to this application.

FIG. 6 is a schematic diagram of locations of a user and an electronic device in an air gesture recognition process according to this application. In an implementation process of a method for quickly enabling a function of an application provided in this application, a location relationship between an electronic device and a user is shown in FIG. 6, and the user faces the electronic device, so that a collection device of the electronic device can collect facial feature information of the user. In addition, a hand of the user also falls within a range in which an image can be collected by the collection device of the electronic device. It should be understood that the collection device in this application is not limited to the camera, the 3D sensor, and the like described above. A collection device for obtaining an air gesture of the user and a collection device for obtaining facial information of the user may be a same device, for example, the camera. Alternatively, the devices may be different devices. For example, the air gesture of the user may be obtained by using the camera, and the facial information of the user may be collected through 3D facial recognition. This is not limited in this application.

When the user makes a specific air gesture, the electronic device may collect, by using the camera, information such as a gesture of a finger, a movement direction of a hand, or a movement speed of the hand, and determine, based on the air gesture, whether to enable a shortcut function of an application. While detecting the air gesture of the user, the electronic device performs verification on facial information based on collected facial feature information of the user, and when the verification succeeds, the electronic device quickly enables the function of the application.

It should be understood that a type of an application that is quickly opened and a specific function in the application are not limited in this application. For example, the function that is quickly enabled may be a Money function of WeChat, a payment function of Alipay, a function of opening a private album, or a function of opening a private application. In the embodiments of this application, an example in which the Money function WeChat is quickly enabled is used for description.

Figure 7A:
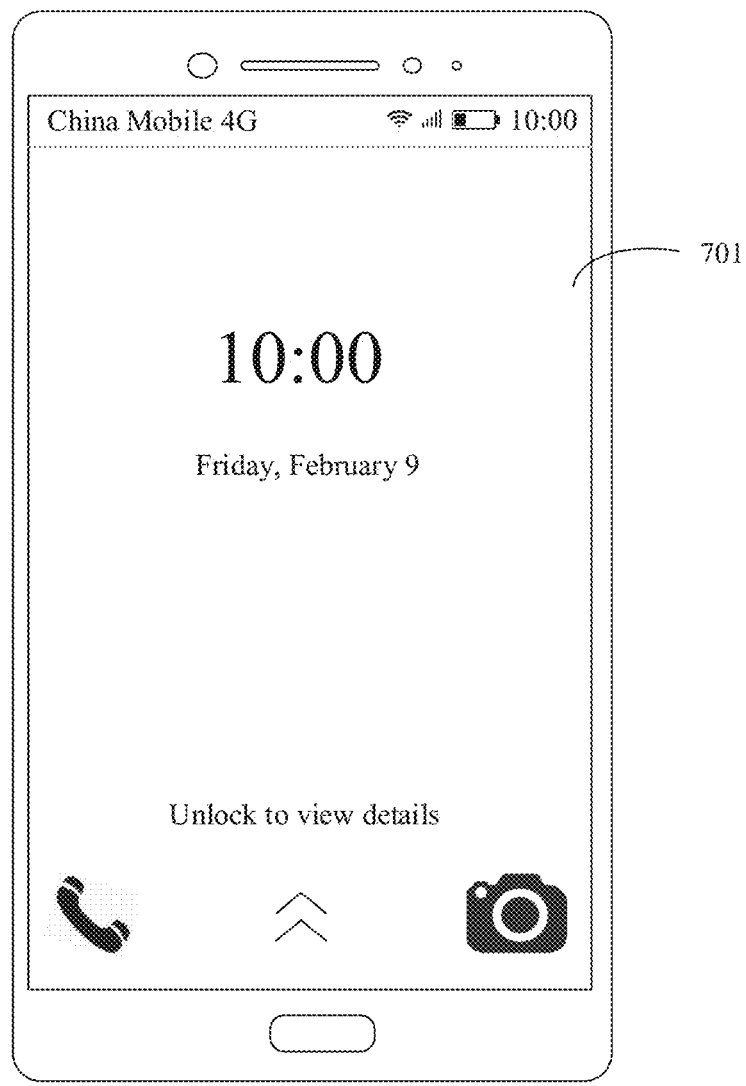
FIG. 7(a) to FIG. 7(d) are schematic diagrams of an example of enabling a shortcut function according to an embodiment of this application.

FIG. 7(a) to FIG. 7(d) are schematic diagrams of an example of enabling a shortcut function according to an embodiment of this application. FIG. 7(a) shows currently output interface content 701 that is displayed by a screen display system of a mobile phone in a lock screen state of the mobile phone. The interface content 701 is a lock screen of the mobile phone. The lock screen 701 displays current time, a date, and a dialer application and a camera application that are in a lock screen state, and the lock screen 701 further includes a display box "unlock to view details" that is used to prompt a user.

It should be understood that the lock screen is an interface that is displayed after the user presses a power button or a home button in a screen-off state of the electronic device, or may be an interface that is displayed after the terminal detects, by using a sensor, that the user picks up the terminal and automatically lights up the screen. The user makes an air gesture at a specific distance from a display of the electronic device. In this embodiment of this application, as an example instead of a limitation, a gesture used to enable a Money function of WeChat is a gesture that the user extends five fingers and waves the five fingers left and right.

Figure 7B:
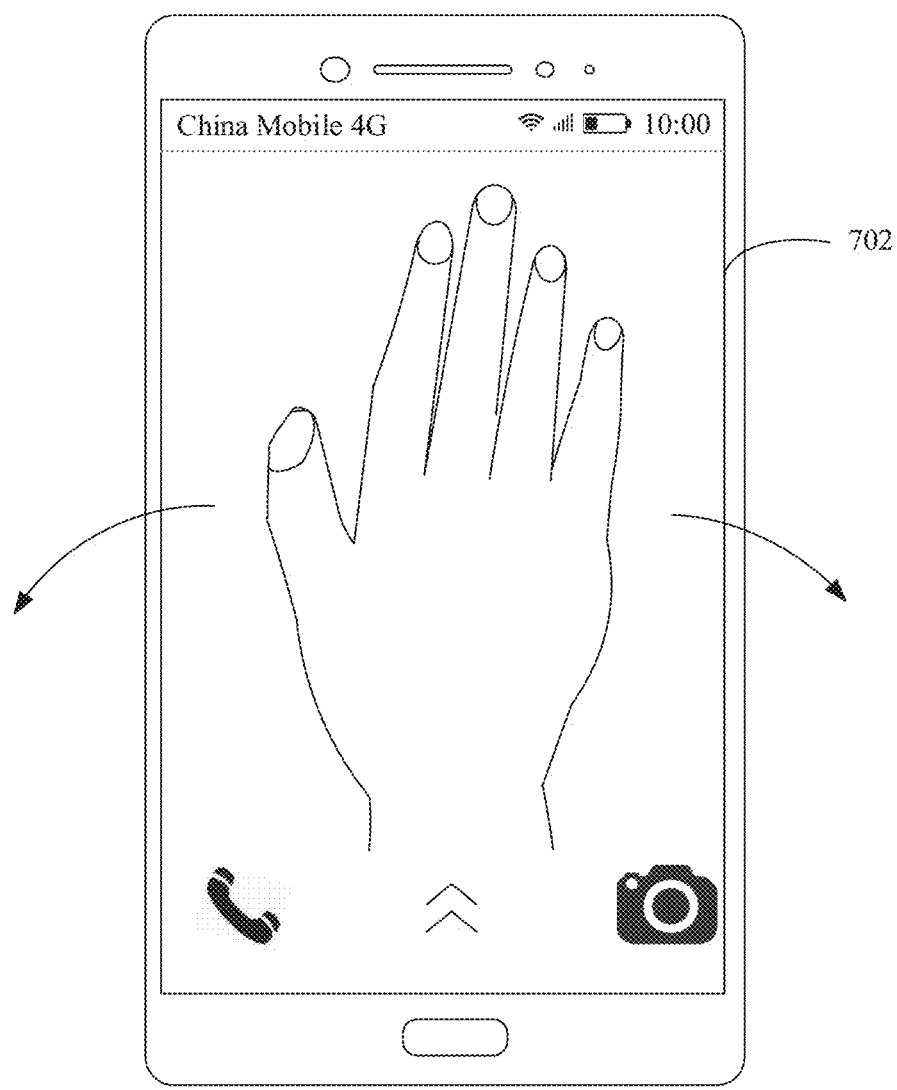

As shown in FIG. 7(b), the user extends five fingers and waves the five fingers left and right at a distance from the display of the electronic device, and the electronic device obtains image information by using a camera, and determines, based on the image information, that a current gesture of the user is waving left and right. The electronic device obtains a facial feature of the user, and compares the facial feature of the user with a facial feature that is previously stored for information verification. In a specific time, when a degree of matching between the currently obtained facial feature of the user and the facial feature that is previously stored by the electronic device is greater than a preset value, that is, when verification succeeds, the electronic device may directly display an interface 305 of the Money function of WeChat shown in FIG. 7(d).

Figure 7C:
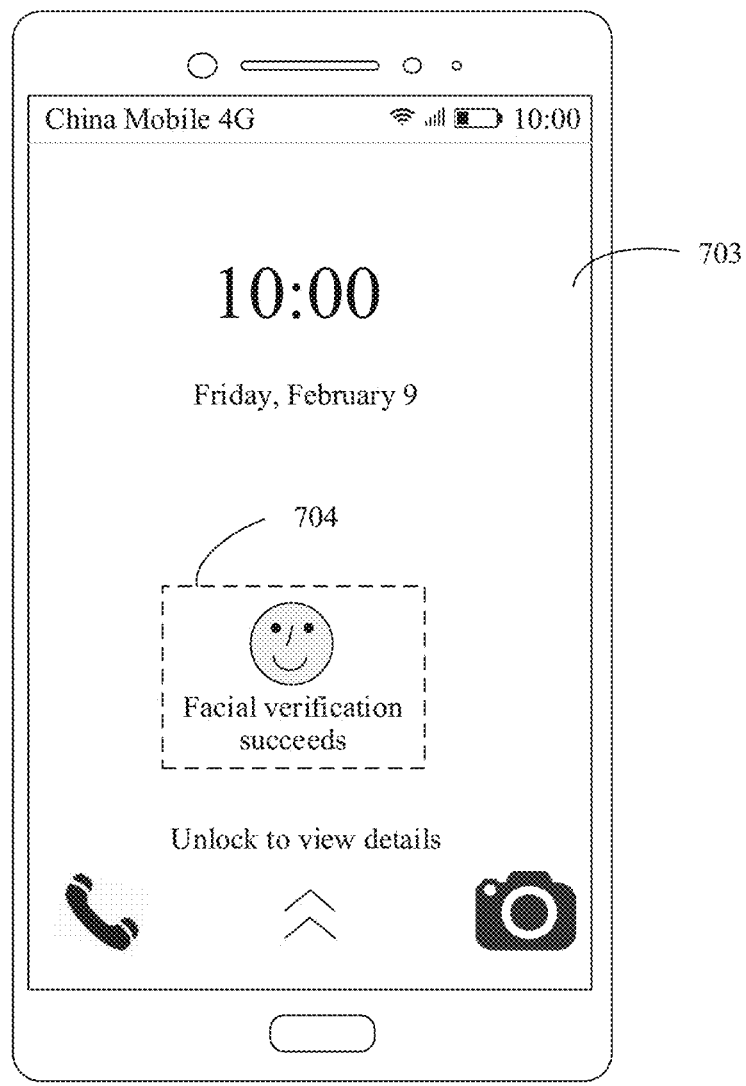
Figure 7D:

In a possible implementation, when verification of the currently obtained facial feature of the user based on the facial feature that is previously stored by the electronic device succeeds, the electronic device may first display an interface 703 shown in FIG. 7(c). The interface 703 includes a facial verification prompt box 704. The facial verification prompt box 704 is used to prompt the user that "facial verification succeeds". Then, the electronic device displays the interface 305 of the Money function of WeChat shown in FIG. 7(d). Optionally, after prompting the user that "facial verification succeeds", the electronic device automatically displays the interface shown in FIG. 7(d).

Optionally, when the electronic device displays the facial verification prompt box 704 that is used to prompt the user that "facial verification succeeds", the facial verification prompt box 704 may be displayed in a locked interface 703, or may be displayed on an unlocked home screen. After a period of time, the electronic device displays the interface 305 of the Money function of WeChat shown FIG. 7(d). This is not limited in this application.

It should be understood that, display duration of the facial verification prompt box 704 that is used to prompt the user that "facial verification succeeds" is not limited in this application. For example, the display duration of the facial verification prompt box 704 may be 1 second or other fixed display duration.

It should be further understood that, in a process of quickly enabling the Money function of WeChat, the camera of the electronic device needs to collect air gesture information of the user and a facial feature of the user. Optionally, the electronic device may enable a collection function of the camera after the user presses a power button or a home button, to collect, in real time, image information that can be obtained by the camera. Alternatively, the electronic device always enables a collection function of the camera, to collect, in real time, image information that can be obtained by the camera. For example, the electronic device described above collects image information at a fixed frame rate or a gradually changing frame rate. Details are not described herein again.

Alternatively, when it is detected, by the sensor module 180 of the electronic device 100, that an environment around the electronic device changes, enabling of a collection function of the camera may be triggered. For example, when it is detected, by using the optical sensor 180G of the electronic device shown in FIG. 1, that light around the electronic device changes, enabling of the collection function of the camera is triggered. When the user or a hand of the user approaches the electronic device but does not touch the electronic device, for example, when the user or the hand of the user and the electronic device are in the location relationship in FIG. 6, brightness of light around the electronic device changes. The optical sensor 180G of the electronic device may detect a change of light, to trigger enabling of the collection function of the camera to obtain an image. The electronic device determines a gesture of the user based on the collected image, to determine whether to quickly enable the Money function of WeChat.

It should be understood that a sequence of recognizing the air gesture of the user and performing verification on the facial feature information in the process of quickly enabling a function is not limited in this application. For example, the electronic device may collect the gesture of the user and the facial feature of the user at the same time, and perform recognition at the same time. When recognizing that the gesture of the user is that five fingers extend and wave left and right, and the facial feature of the user is verified, the electronic device displays the interface of the Money function of WeChat shown in FIG. 7(d).

Alternatively, the electronic device may first collect the gesture of the user, and perform recognition. When recognizing that the gesture is that five fingers extend and wave left and right, the electronic device obtains the facial feature of the user within a specific time for verification. When the verification succeeds, the electronic device displays the interface of the Money function of WeChat shown in FIG. 7(d).

Alternatively, the electronic device may first collect the facial feature of the user for verification. When verification on the facial feature succeeds, the electronic device obtains the gesture of the user for recognition. When recognizing that the gesture is that five fingers extend and wave left and right, the electronic device displays the interface of the Money function of WeChat shown in FIG. 7(d).

In a possible implementation, when the electronic device recognizes the gesture of the user and performs verification on the facial feature in a specific sequence, a specific time between the recognition and the verification should be limited. The specific time is preset duration, for example, 3 seconds. Specifically, when the electronic device recognizes that the gesture is that five fingers extend and wave left and right, if the facial feature of the user is not obtained for verification within 3 seconds, even if the facial feature of the user is obtained for verification after 3 seconds, and the verification succeeds, the Money function of WeChat cannot be enabled, either. Limiting the time can increase security of enabling a shortcut function. In another possible implementation, when the electronic device has verified the facial information of the user, and displays an unlock interface, the electronic device does not need to detect a preset air gesture within limited preset duration (for example, the foregoing three-second time limitation) to display the interface of the Money function of WeChat. As long as the electronic device is unlocked after the facial information of the user is verified, if the user initiates an air gesture, when recognizing that the air gesture is a preset air gesture, the electronic device may enable the Money function of WeChat. In this way, a quantity of times of recognition and verification on the facial information by the electronic device can be reduced. This reduces power consumption of the electronic device while simplifying operations and improving user experience.

When the electronic device is in a lock screen state, the electronic device collects the air gesture of the user shown in FIG. 7(b) and recognizes the air gesture of the user shown in FIG. 7(b) as a gesture used to enable the Money function of WeChat, and the electronic device performs verification based on the collected facial feature of the user. When the verification succeeds, FIG. 7(c) or FIG. 7(d) may be displayed. FIG. 8(a) to FIG. 8(e) are schematic diagrams of an example in which a shortcut function fails to be enabled according to an embodiment of this application.

When the electronic device recognizes that the gesture of the user is the gesture used to enable the Money function of WeChat, but fails to verify the facial feature of the user within a specific period of time, a lock screen 803 of the electronic device may be displayed. That is, the facial verification fails, and the electronic device remains in a lock screen state.

Figure 8A:
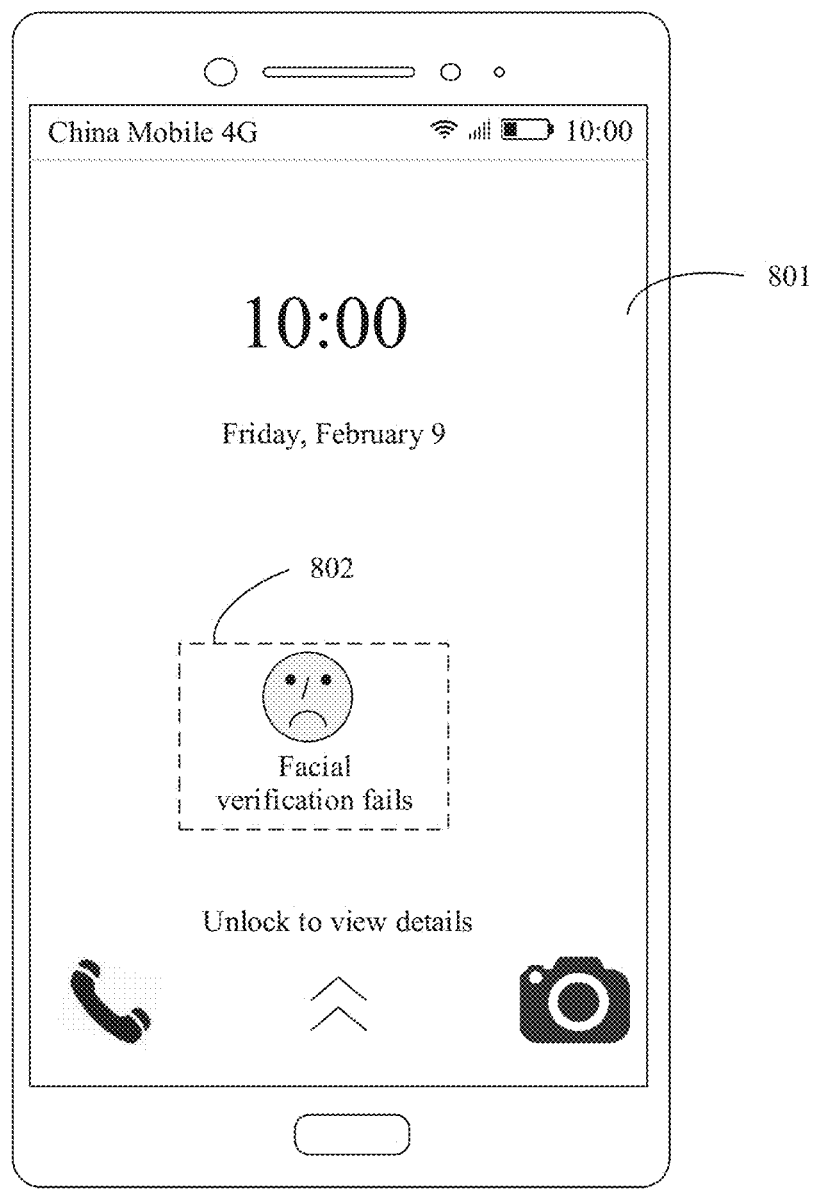
FIG. 8(a) to FIG. 8(e) are schematic diagrams of an example in which a shortcut function fails to be enabled according to an embodiment of this application.
Figure 8B:
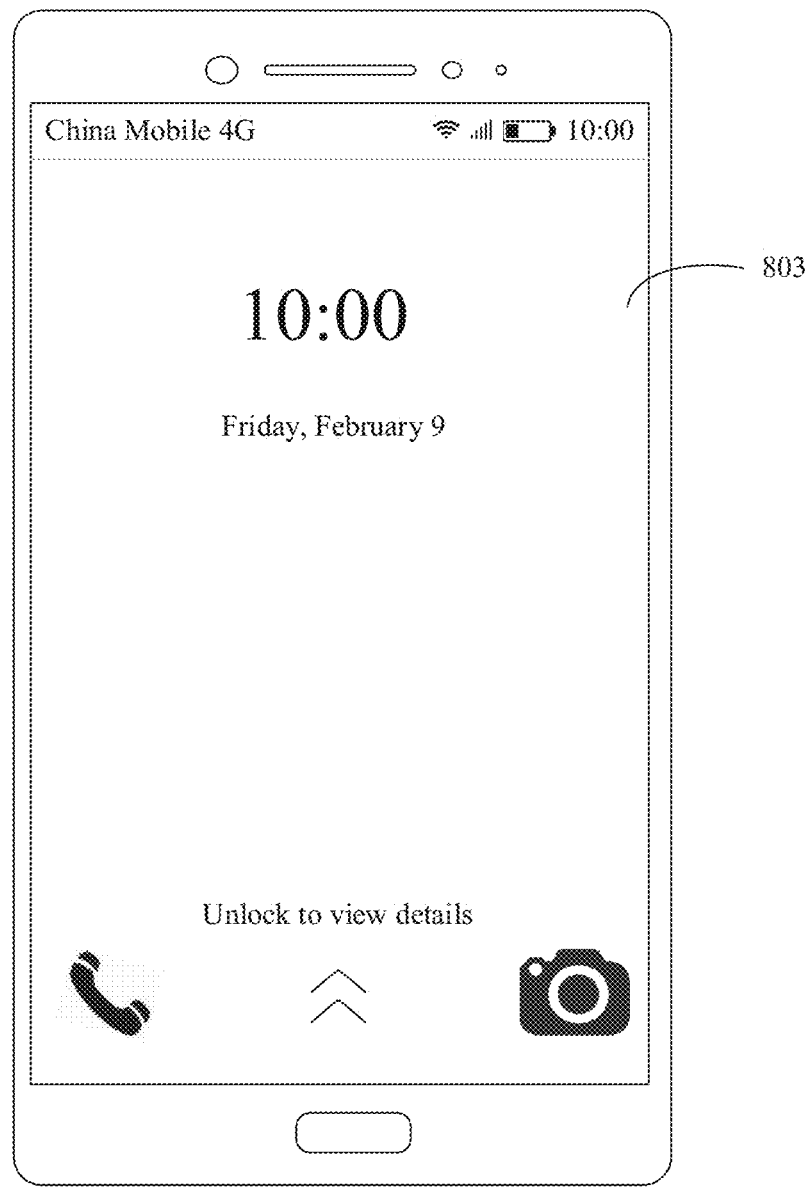

Optionally, the electronic device may display an interface 801 shown in FIG. 8(a). The interface is a lock screen of the electronic device. That is, the interface 801 may further include a facial verification prompt box 802. The facial verification prompt box 802 is used to prompt the user that "facial verification fails".

Optionally, the electronic device may alternatively continue to display the lock screen, prompt the user in a manner such as vibration that the facial verification fails, and remain in the lock screen state. This is not limited in this application.

Figure 8C:
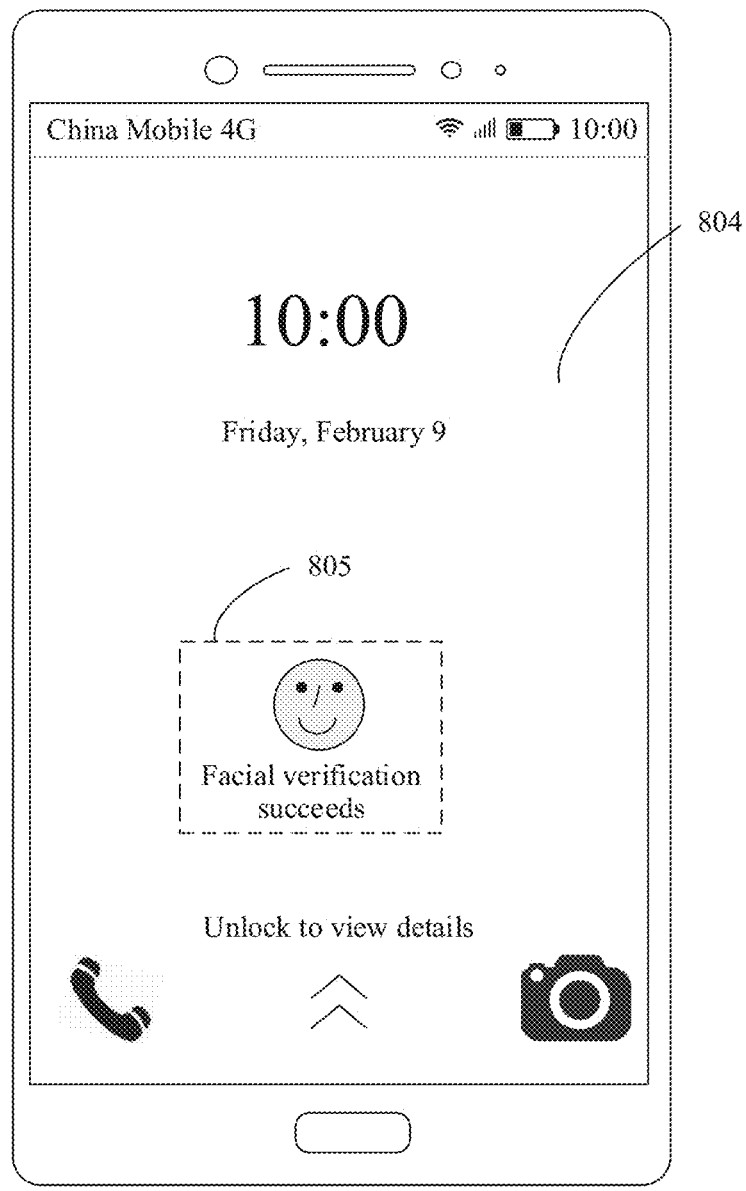
Figure 8D:
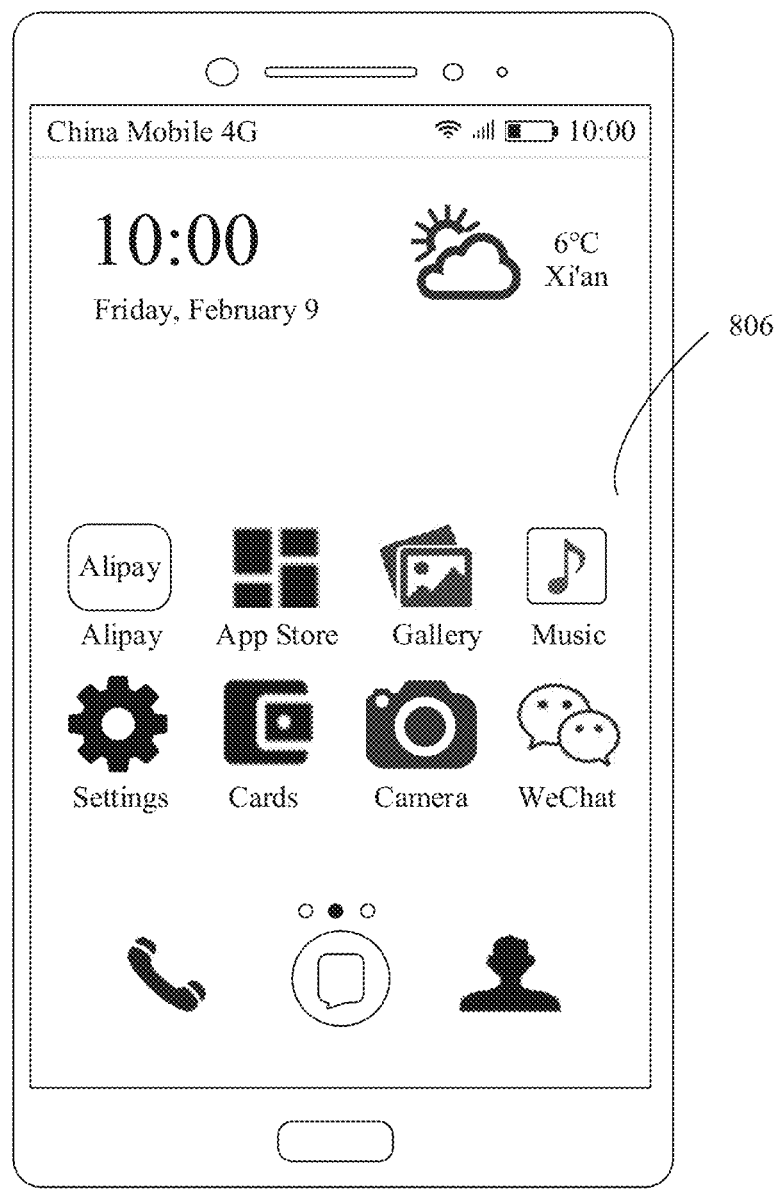

When the electronic device first collects a facial feature of the user, and verification on the facial feature succeeds, but an air gesture of the user is incorrectly recognized or an air gesture of the user is not recognized in a specific time, the electronic device may perform only unlocking, and display a home screen 806 shown in FIG. 8(d).

Optionally, the electronic device may first display an interface 804 shown in FIG. 8(c), display a facial verification prompt box 805 to prompt the user that "facial verification succeeds", and then perform unlocking and display the home screen 806 shown in FIG. 8(d).

Figure 8E:
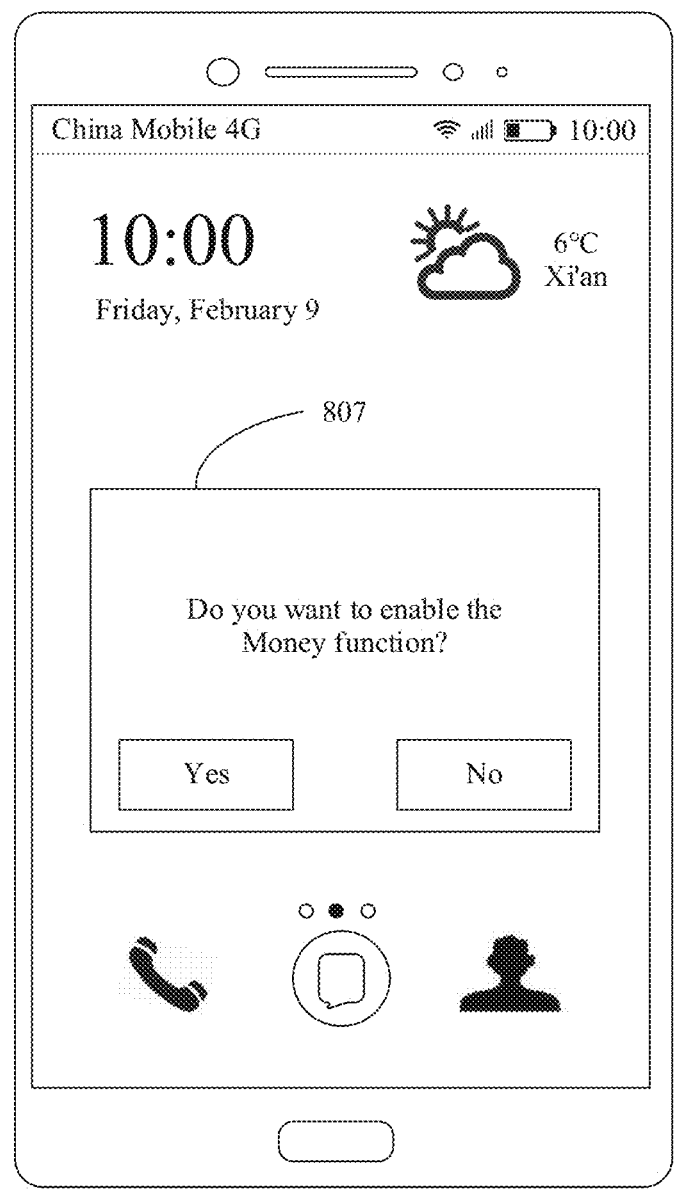

Alternatively, after the facial verification succeeds, the electronic device displays a prompt box 807 on the unlocked home screen shown in FIG. 8(d), and displays an interface shown in FIG. 8(e). The prompt box 807 may be used to prompt the user whether to enable the Money function of WeChat. The user may tap "yes" to restart recognition of the air gesture and verification on the facial information by the electronic device, or may tap "no" to close the prompt box. Alternatively, the prompt box 807 may display "please enter a gesture to enable the Money function of WeChat", to prompt the user that an interface of the Money function of WeChat may be currently displayed by demonstrating a preset air gesture. Content and a form of the prompt box are not limited in this application.

Optionally, when the electronic device displays the facial verification prompt box 805 that is used to prompt the user that "facial verification succeeds", the facial verification prompt box 805 may be displayed in a locked interface 804, or may be displayed on the unlocked home screen 806. This is not limited in this application.

In another possible implementation, after the electronic device has verified the facial information of the user and displays the unlocked home screen shown in FIG. 8(d), as long as the user initiates an air gesture, the electronic device can enable the Money function of WeChat when the electronic device recognizes that the air gesture is the preset air gesture. Different from the foregoing description in which the Money function of WeChat can be enabled only when both the facial information and the air gesture are verified, in this implementation, for example, the Money function of WeChat can be enabled as long as the corresponding preset air gesture is detected in an unlock screen state of the electronic device. In this way, a quantity of times of recognition and verification on facial information by the electronic device can be reduced. This reduces power consumption of the electronic device while simplifying operations and improving user experience.

In addition, the foregoing method is further applicable to the unlock screen state of the electronic device. For example, when the electronic device displays the home screen or the electronic device runs any application, when the user needs to use the Money function of WeChat, the method described above in FIG. 7(a) to FIG. 7(d) and FIG. 8(a) to FIG. 8(e) may be performed to quickly enable the Money function of WeChat. For example, the user is reading an e-book, and the electronic device displays a text interface of the e-book. When the user needs to make payment, the user may demonstrate an air gesture at a distance from the electronic device. When the electronic device recognizes that the gesture is the gesture used to enable the Money function of WeChat and facial verification succeeds, the electronic device immediately displays the interface of the Money function shown in FIG. 7(d).

According to the foregoing technical solution, in a screen-on state, a gesture of the user may be collected by using the camera of the electronic device, and the gesture of the user may be recognized. In addition, the facial feature of the user is obtained, to verify whether the obtained facial feature is a facial feature entered by a user or a stored facial feature. When facial verification of the user succeeds and the gesture is the preset gesture used to enable the Money function of WeChat, the Money function of WeChat is quickly enabled, and the interface of the Money function of WeChat is directly displayed. In the method, the electronic device quickly enables a function of an application with reference to both a gesture and a face, so that operations can be simplified, an accidental touch problem can also be avoided, and user experience is improved.

The foregoing describes the shortcut function enabling method when the electronic device is in the screen-on state. The shortcut function enabling method provided in this application is also applicable to a black screen state of the electronic device. In the black screen state, the screen of the electronic device may be in both locked and off. Alternatively, when the user does not set a lock screen function of the electronic device, in the black screen state, the screen of the electronic device is only off. This is not limited in this application. The following provides specific descriptions with reference to FIG. 9(a) to FIG. 9(d) and FIG. 10(a) to FIG. 10(g).

Figure 9A:
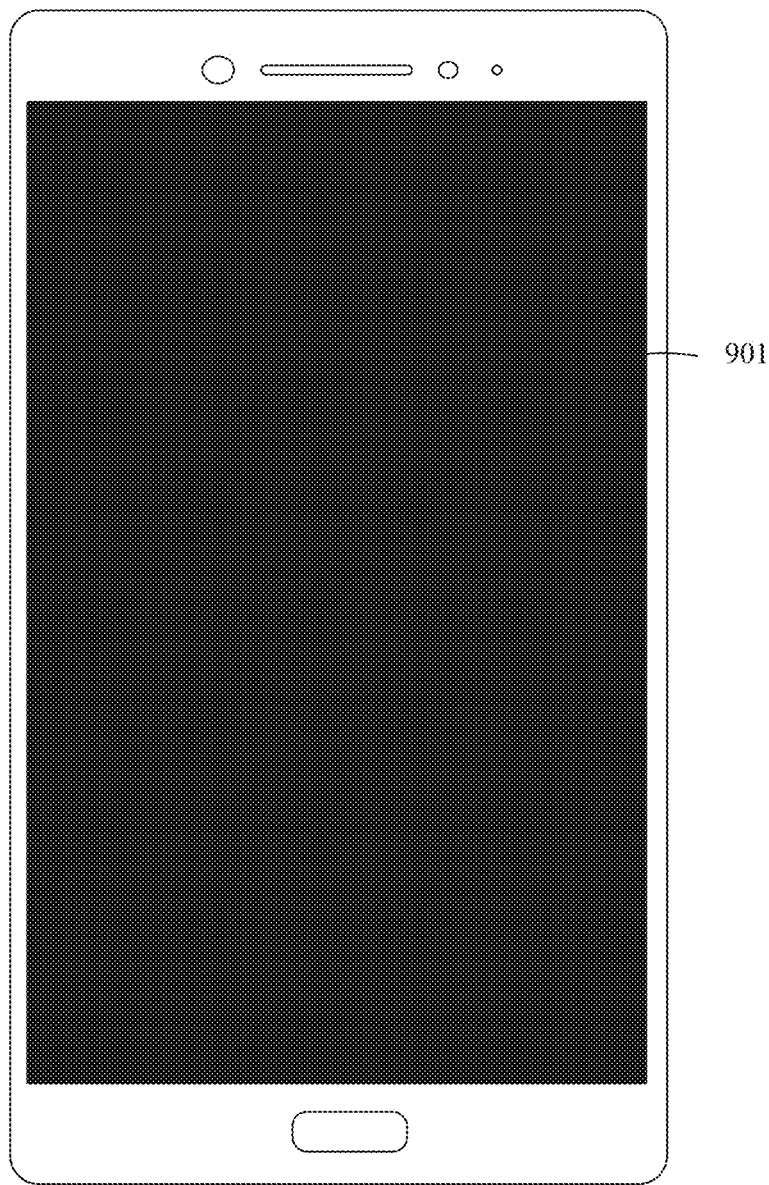
FIG. 9(a) to FIG. 9(d) are schematic diagrams of another example of enabling a shortcut function according to an embodiment of this application.
Figure 9B:
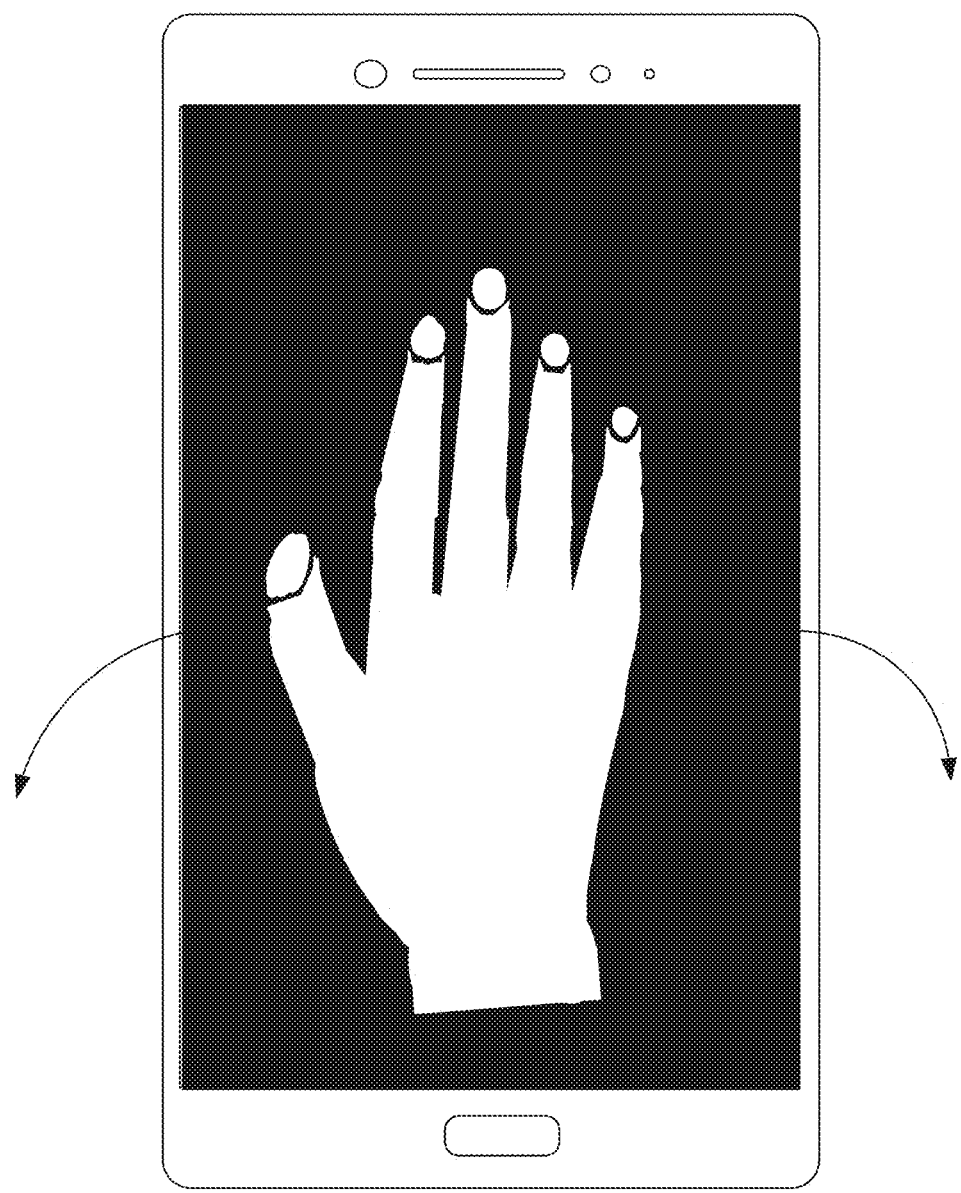

FIG. 9(a) to FIG. 9(d) are schematic diagrams of another example of enabling a shortcut function according to an embodiment of this application. As shown in FIG. 9(a), the electronic device is in the black screen state. The user performs an operation shown in FIG. 9(b), and demonstrates, at a distance from the electronic device, an air gesture that five fingers extend and wave left and right. When the electronic device recognizes that the gesture is the gesture used to enable the Money function of WeChat and facial verification succeeds, the electronic device immediately displays an interface 904 of the Money function shown in FIG. 9(d).

Figure 9C:
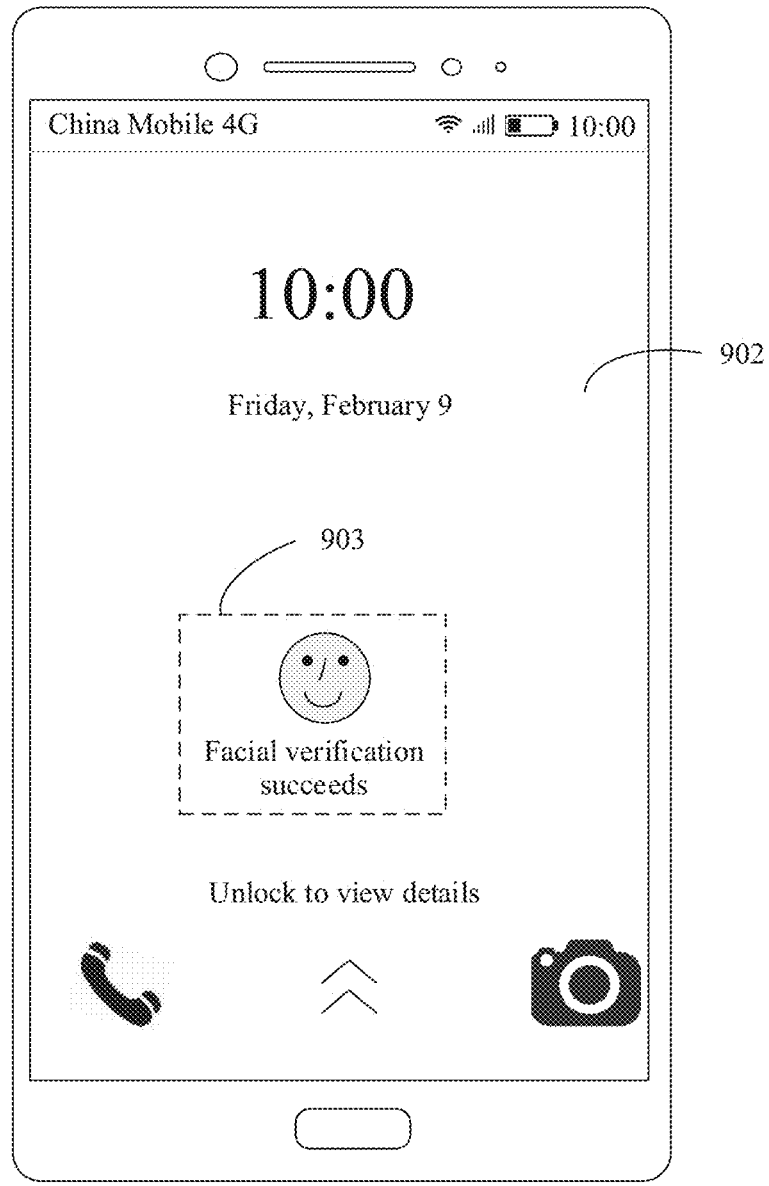
Figure 9D:

In a possible implementation, when the electronic device recognizes that the gesture is the gesture used to enable the Money function of WeChat and facial verification succeeds, the electronic device may display an interface 902 shown in FIG. 9(c). Specifically, the electronic device first lights up a screen, displays a facial verification prompt box 903 that is used to prompt the user that "facial verification succeeds", then performs unlocking, and displays the interface 904 of the Money function shown in FIG. 9(d).

Optionally, when the electronic device displays the facial verification prompt box 903 that is used to prompt the user that "facial verification succeeds", the facial verification prompt box 903 may be displayed in a locked interface 902, or may be displayed on an unlocked home screen. This is not limited in this application.

It should be understood that, in the foregoing process of quickly enabling the Money function of WeChat, a camera of the electronic device needs to be in a monitoring state. When a gesture of the user changes or a facial feature of the user appears in an image collected by the camera, the gesture of the user is recognized, and verification on the facial feature of the user is performed. Alternatively, when it is detected, by the sensor module 180 of the electronic device 100, that an environment around the electronic device changes, enabling of a collection function of the camera may be triggered. This is not limited in this application.

It should be further understood that a sequence of recognizing the air gesture of the user and performing verification on the facial feature information in the process of quickly enabling a function in the black screen state is not limited in this application. For example, the electronic device may collect the gesture of the user and the facial feature of the user at the same time, and perform recognition at the same time. When recognizing that the gesture of the user is that five fingers extend and wave left and right, and the facial feature of the user is verified, the electronic device displays the interface of the Money function of WeChat shown in FIG. 9(d). For details, refer to related descriptions about the sequence of recognizing the user's air gesture and performing verification on the facial feature in the embodiments in FIG. 7(a) to FIG. 7(d) and FIG. 8(a) to FIG. 8(e). Details are not described herein again.

FIG. 10(a) to FIG. 10(g) are schematic diagrams of another example in which a shortcut function fails to be enabled according to an embodiment of this application. When the electronic device is in the black screen state shown in FIG. 10(a), in FIG. 10(b), the electronic device recognizes that an air gesture of the user is the preset gesture used to enable the Money function of WeChat. However, verification on the facial feature information fails, the electronic device may display an interface 1001 shown in FIG. 10(c). Specifically, the electronic device may light up a screen, and display a facial verification prompt box 1002. The facial verification prompt box 1002 is used to prompt the user that "facial verification fails". After displaying the facial verification prompt box 1002 for a period of time, the electronic device continues to enter the screen-off state shown in FIG. 10(d).

Figure 10A:
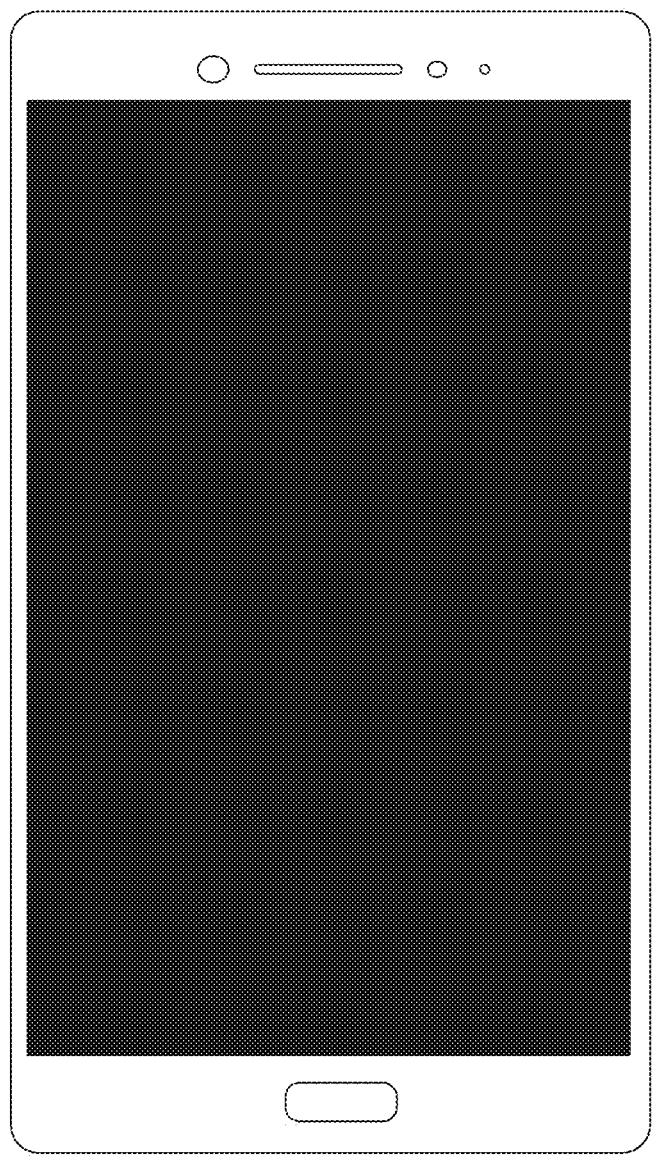
FIG. 10(a) to FIG. 10(g) are schematic diagrams of another example in which a shortcut function fails to be enabled according to an embodiment of this application.
Figure 10B:
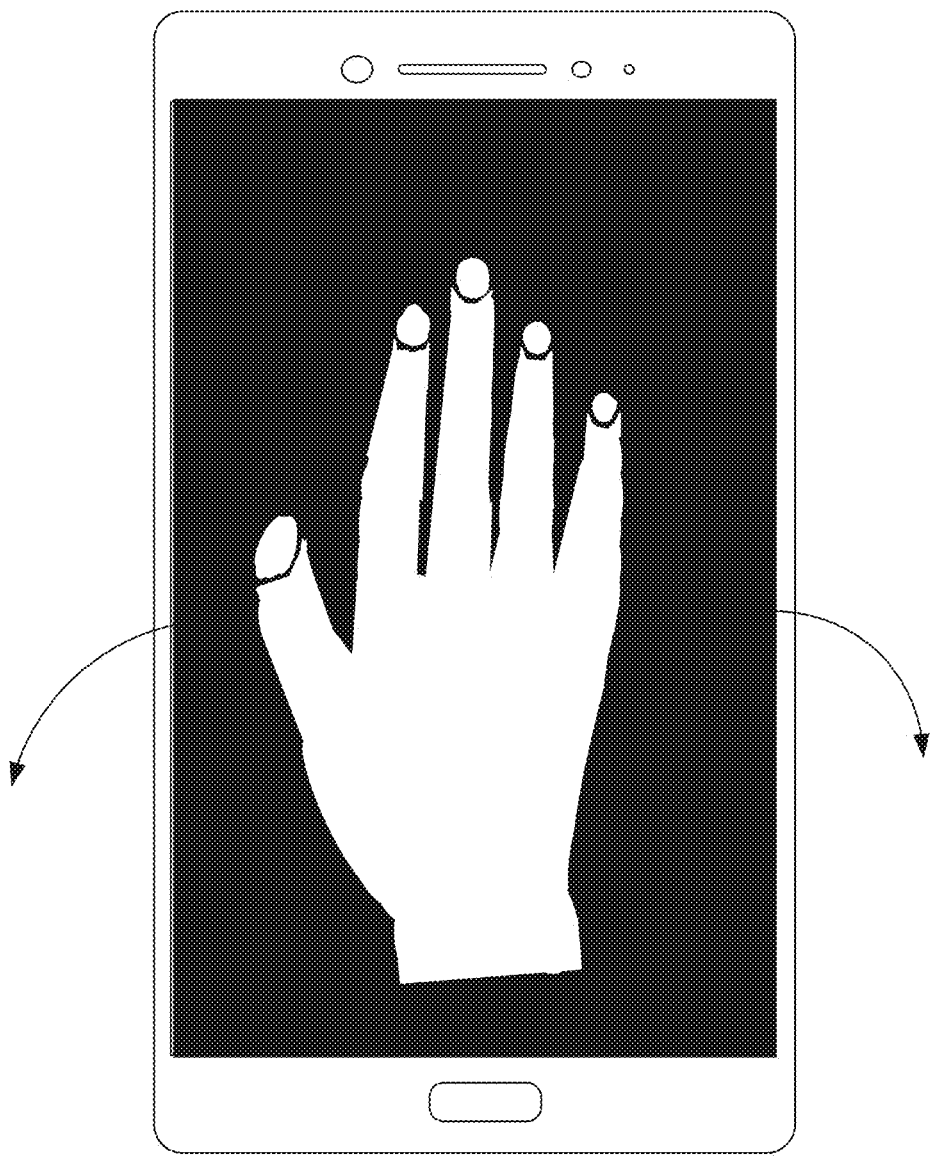
Figure 10C:
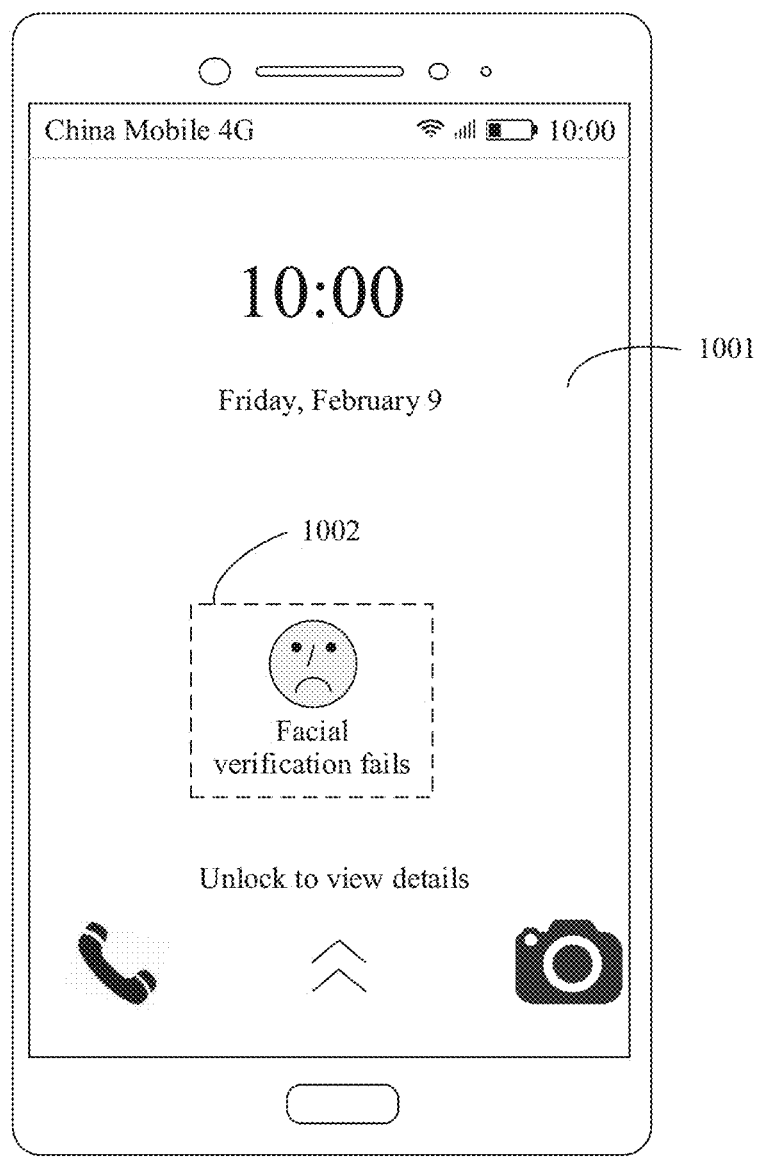
Figure 10D:
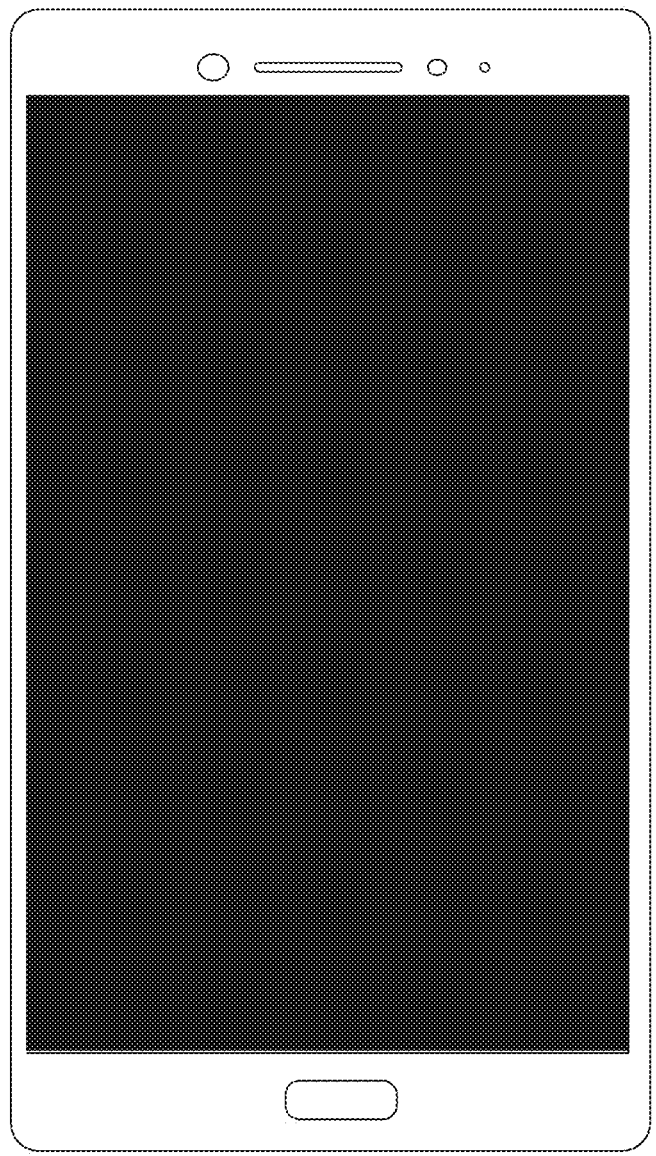

In a possible implementation, when the electronic device recognizes that the air gesture of the user is the preset gesture used to enable the Money function of WeChat, but verification on the facial feature information fails, the electronic device may not light up the screen, and only prompt, through vibration, the user that the verification fails, and the screen is continuously in the screen-off state shown in FIG. 10(d).

Figure 10E:
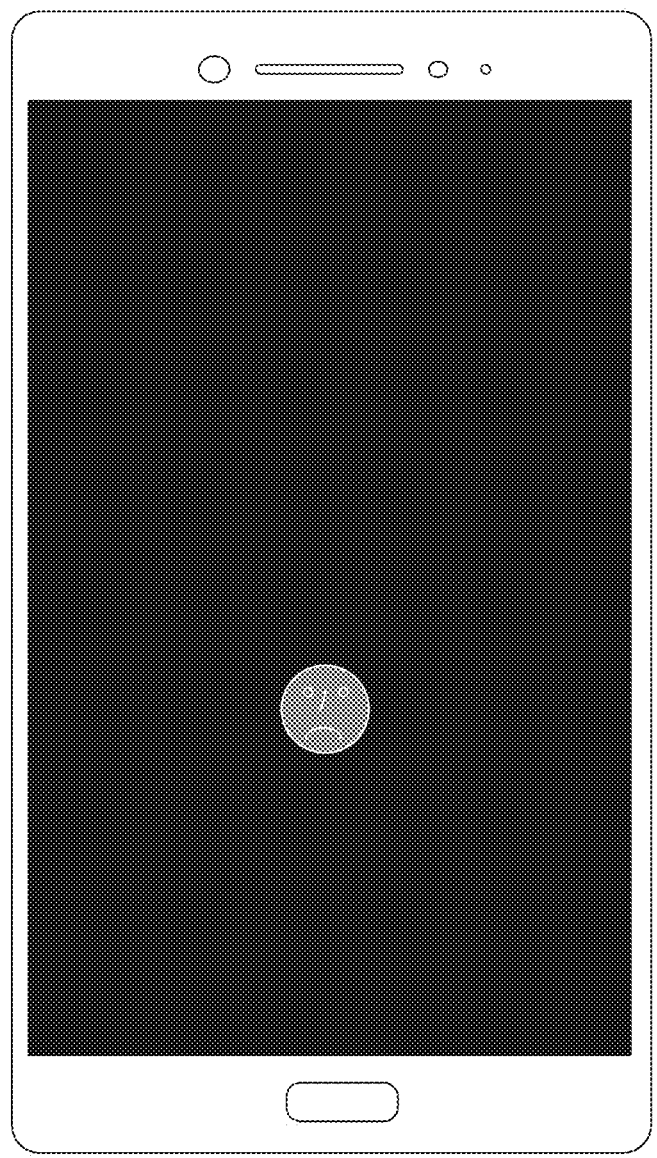

Optionally, when the electronic device recognizes that the air gesture of the user is the preset gesture used to enable the Money function of WeChat, but verification on the facial feature information fails, as shown in FIG. 10(e), the electronic device may not light up the screen, and display only an icon in a partial display area in the black screen state. The icon is used to prompt the user that the facial verification fails. Alter displaying the icon for a period of time, the electronic device continues to enter the screen-off state shown in FIG. 10(d).

Figure 10F:
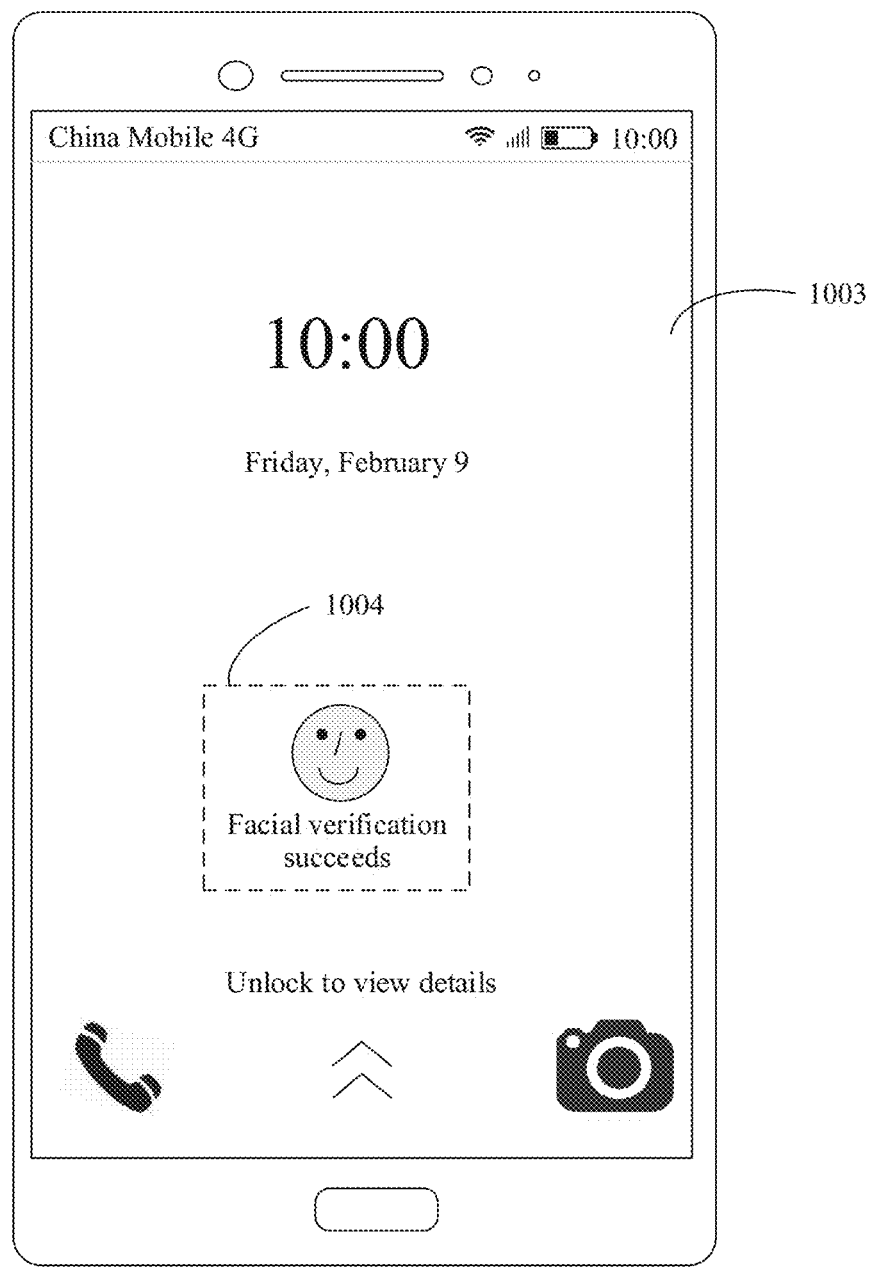

In another possible implementation, in the black screen state, as shown in FIG. 10(b), when the electronic device recognizes that the air gesture of the user is not the preset gesture used to enable the Money function of WeChat, but verification on the facial feature information succeeds, the electronic device may display an interface 1003 shown in FIG. 10(f). Specifically, the electronic device may light up the screen, display a facial verification prompt box 1004, unlock the electronic device, and display an unlocked home screen shown in FIG. 10(g). The facial verification prompt box 1004 is used to prompt the user that "facial verification succeeds".

According to the foregoing technical solution, in a screen-off state, a gesture of the user may be collected by using the camera of the electronic device, and the gesture of the user may be recognized. In addition, the facial feature of the user is obtained, to verify whether the obtained facial feature is a facial feature entered by a user or a stored facial feature. When facial verification of the user succeeds and the gesture is the preset gesture used to enable the Money function of WeChat, the Money function of WeChat is quickly enabled, and the interface of the Money function of WeChat is directly displayed. In the method, in the screen-off state, the electronic device quickly enables a function of an application with reference to both a gesture and a face, so that operations can be simplified, an accidental touch problem can also be avoided, and user experience is improved.

The foregoing describes in detail the man-machine interaction embodiments of this application with reference to FIG. 3(a) to FIG. 3(d) to FIG. 10(a) to FIG. 10(g). To better understand the shortcut function enabling method provided in this application, the following describes a specific implementation process.

Figure 11:
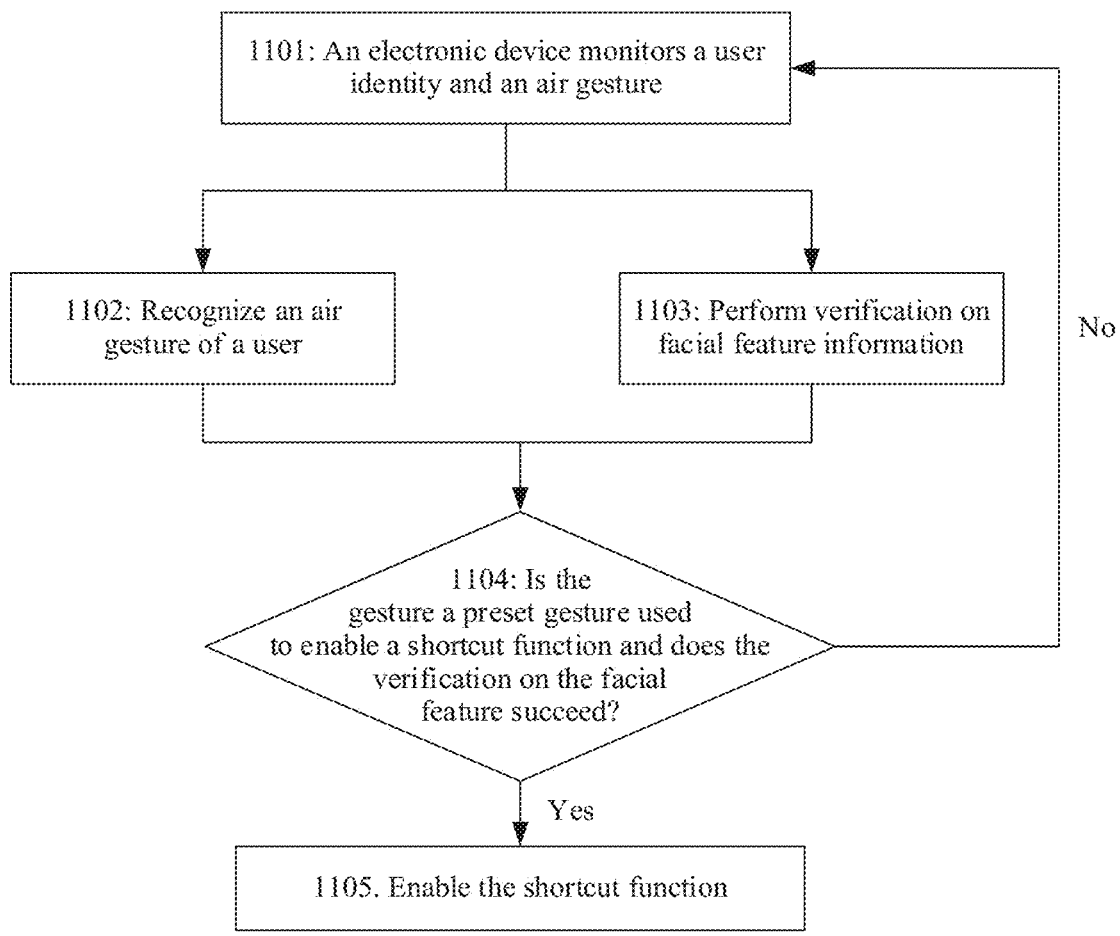
FIG. 11 is an implementation flowchart of a shortcut function enabling method according to an embodiment of this application.

FIG. 11 is an implementation flowchart of a shortcut function enabling method according to an embodiment of this application. It should be understood that the steps shown in FIG. 11 may be implemented by an electronic device or a chip configured in the electronic device. Specifically, FIG. 11 includes the following content.

1101: The electronic device monitors a user identity and an air gesture in real time.

Specifically, the electronic device monitors, in real time, whether a user triggers the air gesture and whether a face appears. The electronic device may perform monitoring by using the camera 193 shown in FIG. 1. For example, the camera may be any camera device such as a common RGB camera, an infrared camera, or a depth camera that can determine a user gesture and a face identity.

In a possible implementation, a monitoring function of the camera may always be enabled. To reduce power consumption of the electronic device, a monitoring function of the camera may be further enabled in a specific triggering manner.

For example, the electronic device may enable a collection function of the camera after the user presses a power button or a home button, to collect, in real time, image information that can be obtained by the camera. Alternatively, the electronic device performs monitoring by using the sensor module 180 shown in FIG. 1. For example, as long as a hand or a face of the user appears around the electronic device, the light sensor 180F may detect a light change, and the optical sensor may transfer information about the light change to the processor 110. The processor controls to enable the collection function of the camera, and starts to trigger detection and recognition of an air gesture by the camera.

1102: The electronic device recognizes an air gesture of the user.

Specifically, if the hand of the user is detected in an image collected by the camera of the electronic device, recognition of the air gesture of the user is started.

It should be understood that the air gesture in this application includes but is not limited to various static gestures and dynamic gestures enumerated in FIG. 5. For example, the static gesture may be an OK gesture, a V gesture, a palm gesture, or the like, and the dynamic gesture may be different types of gestures such as waving up and down, waving left and right, pressing, or drawing a Z. For a same air gesture, operation behavior of different users may be slightly different, but a feature of the gesture is basically unchanged. It may be determined, by recognizing the feature of the gesture, whether the gesture is a preset gesture used to enable a shortcut function.

It should be further understood that each shortcut function may correspond to one preset gesture. For example, in this embodiment of this application, extending five fingers and waving left and right is a preset gesture used to enable a Money function of WeChat. In this application, a correspondence between a gesture and a shortcut function and a method for setting a gesture and a shortcut function are not limited.

1103: The electronic device collects facial feature information of the user and performs verification on the facial feature information.

Specifically, if the face of the user appears within a range in which the camera collects an image, face identity verification is performed.

Verification on facial feature information means that the electronic device performs verification by comparing facial image information that belongs to a user and that is collected by using the camera or another sensor with stored facial feature information previously entered by a user, to determine whether the users are a same person. If a verification result is that the users are a same person the verification succeeds. If a verification result is that the users are not a same person, the verification fails.

It should be understood that a face identity verification method in this application may be performing verification by using a different method such as deep learning in the conventional technology. This is not limited in this application.

It should be further understood that the steps 1102 and 1103 in this application may be performed in a sequence, or may be performed in parallel. This is not limited in this application.

Specifically, when detecting the air gesture and the facial feature, the electronic device needs to perform parallel verification on the air gesture and the facial feature. In an actual processing process, a part of a face may be blocked when an air gesture is made, and this affects facial verification. Therefore, the parallel verification herein means that if a corresponding air gesture is detected within a specific time interval after the facial feature is detected for verification, it indicates that the verification succeeds. Alternatively, the parallel verification herein means that if facial verification succeeds within a specific time interval after an air gesture is detected, it indicates that the verification succeeds.

1104: The electronic device determines whether the gesture is a preset gesture used to enable a shortcut function and whether the verification on the facial feature succeeds.

1105: When determining that the gesture is the preset gesture used to enable a shortcut function and the verification on the facial feature succeeds, the electronic device enables the shortcut function.

It should be understood that enabling the shortcut function herein may be invoking a corresponding function. The invoked function may be an application such as WeChat and TikTok installed by the user. Alternatively, the invoked function may be a service or a shortcut function of an application installed by the user, for example, a WeChat QR code, an Alipay QR code, or a home navigation route of a map. Alternatively, the invoked function may be some system level functions such as a voice assistant. In addition, the application may be an application specified by a system of the electronic device, or may be a user-defined application. This is not limited in this application.

In this specification, an interaction mode with reference to both an air gesture and a face is proposed.

According to the foregoing technical solution, a gesture of the user may be collected by using the camera of the electronic device, and the gesture of the user may be recognized. In addition, the facial feature of the user is obtained, to verify whether the obtained facial feature is a facial feature entered by a user or a stored facial feature. When facial verification of the user succeeds and the gesture is the preset gesture used to enable the Money function of WeChat, the Money function of WeChat is quickly enabled, and the interface of the Money function of WeChat is directly displayed. In the method, both air gesture verification and facial feature verification of a user are used, to quickly enable a function of an application. This can simplify operations, resolve a problem that identity recognition cannot be performed by using an air gesture, avoid a problem that an air gesture is prone to cause an accidental touch, and improve user experience.

Figure 12:
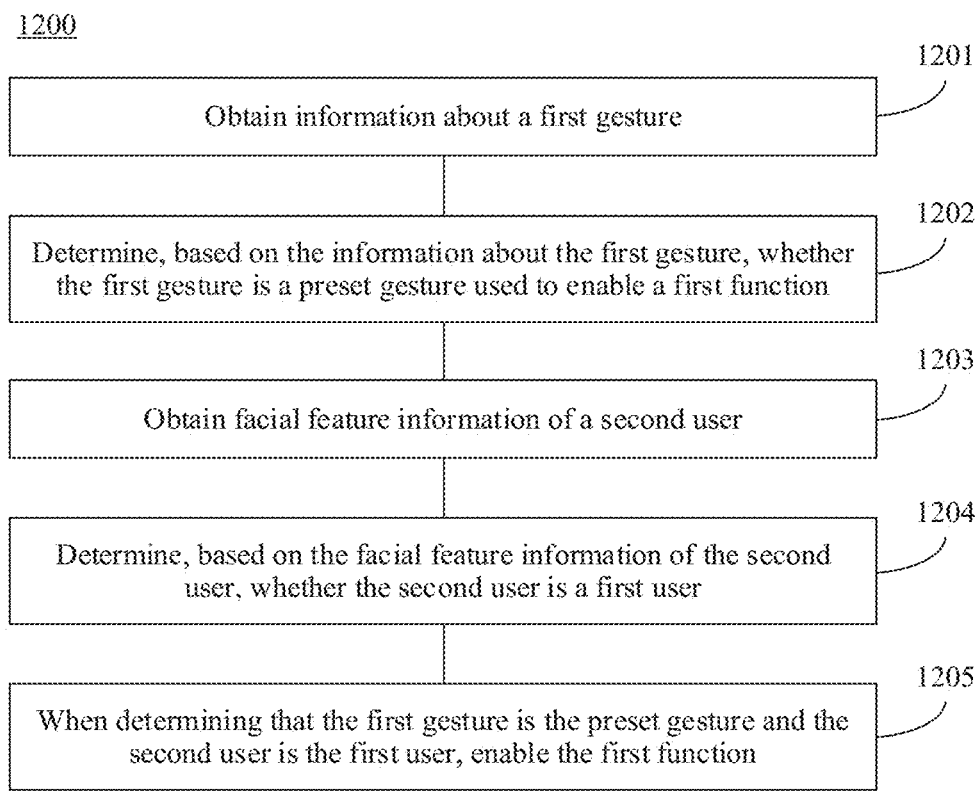
FIG. 12 is a schematic flowchart of a shortcut function enabling method according to an embodiment of this application.

With reference to the foregoing embodiments and related accompanying drawings, an embodiment of this application provides a shortcut function enabling method. The method may be implemented by an electronic device (for example, a mobile phone or a tablet computer) having a camera in FIG. 1 and FIG. 2. FIG. 12 is a schematic flowchart of a shortcut function enabling method according to an embodiment of this application. An electronic device stores a preset gesture and facial feature information of a first user. The preset gesture is used to enable a first function of the electronic device, and the preset gesture is a gesture at a preset distance from the electronic device.

As shown in FIG. 12, the method may include the following steps.

1201: The electronic device obtains information about a first gesture.

1202: The electronic device determines, based on the information about the first gesture, whether the first gesture is the preset gesture used to enable the first function.

In a possible implementation, the electronic device may obtain the information about the first gesture by using a camera, or obtain the information about the first gesture by using an infrared sensor, or obtain the information about the first gesture by using a 3D sensor.

Optionally, the electronic device may determine, based on a degree of matching between the information about the first gesture and information about the preset gesture, that the first gesture is the preset gesture.

Specifically, when the degree of matching between the information about the first gesture and the information about the preset gesture is greater than or equal to a second threshold, the electronic device determines that the first gesture is the preset gesture.

1203: The electronic device obtains facial feature information of a second user.

In a possible implementation, the electronic device may obtain the facial feature information of the second user by using the camera of the electronic device, or obtain the facial feature information of the second user by using the 3D sensor.

1204: The electronic device determines, based on the facial feature information of the second user, whether the second user is the first user.

In a possible implementation, the electronic device may determine, based on a degree of matching between the facial feature information of the second user and the facial feature information of the first user, that the second user is the first user.

Specifically, when the degree of matching between the facial feature information of the second user and the facial feature information of the first user is greater than or equal to a first threshold, the electronic device determines that the second user is the first user.

1205: When determining that the first gesture is the preset gesture and the second user is the first user, the electronic device enables the first function.

When determining that the first gesture is the preset gesture and the second user is the first user, the electronic device displays an interface of the first function.

It should be understood that enabling the shortcut function herein may be invoking a corresponding function. The invoked function may be an application such as WeChat and TikTok installed by the user. Alternatively, the invoked function may be a service or a shortcut function of an application installed by the user, for example, a WeChat QR code, an Alipay QR code, or a home navigation route of a map. Alternatively, the invoked function may be some system level functions such as a voice assistant. In addition, the application may be an application specified by a system of the electronic device, or may be a user-defined application. This is not limited in this application.

In a possible implementation, in the process of enabling a shortcut function described above, the electronic device is in a lock screen state, or the electronic device is in an unlocked state.

It should be understood that the lock screen state of the electronic device may include a state in which the screen is locked and off, or a state in which the screen is locked and on.

For example, FIG. 7(a) to FIG. 7(d) show a process in which the electronic device enables a shortcut function when the electronic device is in the state in which the screen is locked and on.

For example, FIG. 9(a) to FIG. 9(d) show a process in which the electronic device enables a shortcut function when the electronic device is in the state in which the screen s locked and off.

Optionally, when the electronic device determines that the first gesture is the preset gesture and the second user is not the first user, or when the electronic device determines that the first gesture is not the preset gesture and the second user is the first user, the electronic device does not enable the first function.

For example, FIG. 8(a) to FIG. 8(e) show a process in which when the electronic device is in the state in which the screen is locked and on, the shortcut function is not enabled when the electronic device fails to verify an air gesture, or fails to verify facial information, or fails to verify both an air gesture and facial information.

For example, FIG. 10(a) to FIG. 10(e) show a process in which when the electronic device is in the state in which the screen is locked and off, the shortcut function is not enabled when the electronic device fails to verify an air gesture, or fails to verify facial information, or fails to verify both an air gesture and facial information.

In a possible implementation, when the electronic device is in the lock screen state, if the electronic device determines that the first gesture is the preset gesture and the second user is not the first user, the electronic device remains in the lock screen state; or if the electronic device determines that the first gesture is not the preset gesture and the second user is the first user, the electronic device switches to the unlock screen state.

Figure 10G:
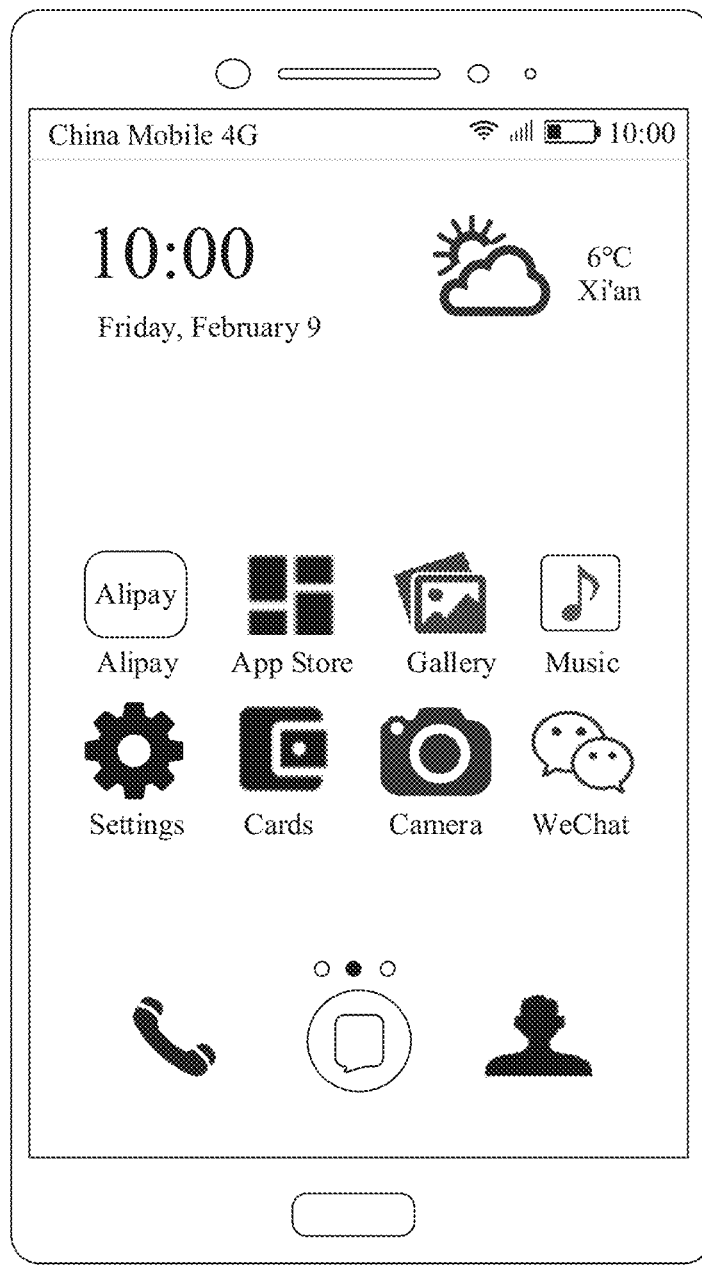

For example, FIG. 10(f) and FIG. 10(g) show that when the electronic device determines that the first gesture is not the preset gesture and the second user is the first user, the electronic device switches to the unlock screen state.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the examples in the foregoing method. For example, each function module corresponding to each function may be obtained through division, or two or more functions may be integrated into one processing module. The integrated module may be implemented in a form of hardware. It should be noted that, in the embodiments, division into modules is an example, and is merely a logical function division. In actual implementation, another division manner may be used.

Figure 13:
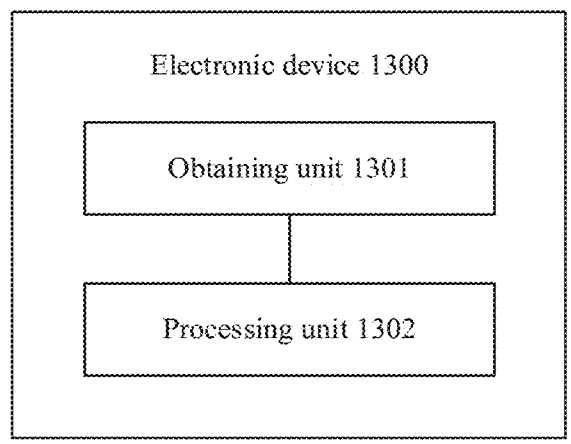
FIG. 13 is a schematic diagram of an example of composition of an electronic device according to an embodiment of this application.

When each function module is obtained through division based on each corresponding function, FIG. 13 is a possible schematic diagram of composition of an electronic device 1300 in the foregoing embodiment. As shown in FIG. 13, the electronic device 1300 may include an obtaining unit 1301 and a processing unit 1302.

The obtaining unit 1301 may be configured to support the electronic device 1300 in performing step 1201, step 1203, and/or another process of the technology described in this specification.

The processing unit 1302 may be configured to support the electronic device 1300 in performing step 1202, step 1204, step 1205, and/or another process of the technology described in this specification.

It should be noted that all related content of the steps in the foregoing method embodiments may be cited in function descriptions of corresponding function modules. Details are not described herein again.

The electronic device provided in this embodiment is configured to perform the shortcut function enabling method. Therefore, an effect same as the effect of the foregoing implementation methods can be achieved.

When an integrated unit is used, the electronic device may include a processing module, a storage module, and a communications module. The processing module may be configured to control and manage actions of the electronic device, for example, may be configured to support the electronic device in performing the steps performed by the obtaining unit 1301 and the processing unit 1302. The storage module may be configured to support the electronic device to store program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communications module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

The embodiments further provide a computer storage medium. The computer storage medium stores computer instructions. When the computer instructions are run on an electronic device, the electronic device is enabled to perform the related method steps, to implement the shortcut function enabling method in the foregoing embodiments.

The embodiments further provide a computer program product. When the computer program product is run on a computer, the computer is enabled to perform the foregoing related steps, to implement the shortcut function enabling method in the foregoing embodiments.

In addition, the embodiments of this application further provide an apparatus. The apparatus may be specifically a chip, a component, or a module. The apparatus may include a processor and a memory that are connected. The memory is configured to store a computer-executable instruction, and when the apparatus runs, the processor may execute the computer-executable instruction stored in the memory, so that the chip performs the shortcut function enabling method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division into the foregoing function modules is taken as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into modules or units is merely logical function division and may be other division in an actual implementation. For example, a plurality of units or components may be combined or integrated into another apparatus, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate pans may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically; or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fail within the protection scope of this application. Therefore, the protection scope of this application shall be subject to the protection scope of the claims.

What is claimed is:

1. A comprising:
   storing a preset gesture and first facial feature information of a first user, wherein the preset gesture is configured to enable a first function of an electronic device and is at a preset distance from the electronic device, wherein the first function comprises invoking an application installed on the electronic device, a service of the application, a shortcut function of the application, or a system level function, and wherein the electronic device is either in a lock screen state or in an unlock screen state;
   obtaining first information about a first gesture;
   determining, based on the first information, whether the first gesture is the preset gesture;
   obtaining second facial feature information of a second user;
   determining, based on the second facial feature information, whether the second user is the first user; and enabling the first function when the first gesture is the preset gesture and the second user is the first user.

2. The method of claim 1, further comprising skipping enabling the first function either when the first gesture is the preset gesture and the second user is not the first user or when the first gesture is not the preset gesture and the second user is the first user.

3. The method of claim 1, further comprising:
remaining in the lock screen state when the first gesture is the preset gesture and the second user is not the first user; and
switching to an unlock screen state when the first gesture is not the preset gesture and the second user is the first user.

4. The method of claim 1, further comprising determining, based on a matching degree between the second facial feature information and the first facial feature information, that the second user is the first user.

5. The method of claim 4, further comprising:
identifying that the matching degree is greater than or equal to a first threshold; and
determining, in response to identifying that the matching degree is greater than or equal to the first threshold, that the second user is the first user.

6. The method of claim 1, further comprising:
obtaining the first information using a camera of the electronic device;
obtaining the first information using an infrared sensor of the electronic device; or
obtaining the first information using a three-dimensional (3D) sensor of the electronic device.

7. The method of claim 1, further comprising:
obtaining the second facial feature information using a camera of the electronic device; or
obtaining the second facial feature information using a three-dimensional (3D) sensor of the electronic device.

8. The method of claim 1, further comprising:
determining that the first gesture is the preset gesture and the second user is the first user; and
displaying, in response to determining that the first gesture is the preset gesture and the second user is the first user, an interface of the first function.

9. An electronic device comprising:
a memory configured to store a preset gesture and first facial feature information of a first user, wherein the preset gesture is configured to enable a first function of the electronic device and is at a preset distance from the electronic device, wherein the first function comprises invoking an application installed on the electronic device, a service of the application, a shortcut function of the application, or a system level function, and wherein the electronic device is either in a lock screen state or in an unlock screen state; and
a processor coupled to the memory and, and configured to:
obtain first information about a first gesture;
determine, based on the first information, whether the first gesture is the preset gesture;
obtain second facial feature information of a second user;
determine, based on the second facial feature information, whether the second user is the first user; and enable the first function when the first gesture is the preset gesture and the second user is the first user.

10. The electronic device of claim 9, wherein the processor is further configured to skip enabling the first function either when the first gesture is the preset gesture and the second user is not the first user or when the first gesture is not the preset gesture and the second user is the first user.

11. The electronic device of claim 9, wherein the processor is further configured to:
remain in the lock screen state when the first gesture is the preset gesture and the second user is not the first user; and
switch to an unlock screen state when the first gesture is not the preset gesture and the second user is the first user.

12. The electronic device of claim 10, wherein the processor is further configured to determine, based on a matching degree between the second facial feature information and the first facial feature information, that the second user is the first user.

13. The electronic device of claim 12, wherein the processor is further configured to:
identify that the matching degree is greater than or equal to a first threshold; and
determine, in response to identifying that the matching degree is greater than or equal to a first threshold, that the second user is the first user.

14. The electronic device of claim 9, further comprising:
a camera configured to obtain the first information;
an infrared sensor configured to obtain the first information; or
a three-dimensional (3D) sensor configured to obtain the first information.

15. The electronic device of claim 9, further comprising:
a camera configured to obtain the second facial information; or
a three-dimensional (3D) sensor configured to obtain the second facial information.

16. The electronic device of claim 9, wherein the instructions processor is further configured to:
determine that the first gesture is the preset gesture and the second user is the first user; and
display, in response to determining that the first gesture is the preset gesture and the second user is the first user, an interface of the first function.

17. A computer program product comprising computer-executable instructions stored on a non-transitory computer-readable medium that, when executed by a processor, cause an electronic device to:
store a preset gesture and first facial feature information of a first user, wherein the preset gesture is configured to enable a first function of the electronic device and is at a preset distance from the electronic device, wherein the first function comprises invoking an application installed on the electronic device, a service of the application, a shortcut function of the application, or a system level function, and wherein the electronic device is either in a lock screen state or in an unlock screen state;
obtain first information about a first gesture;
determine, based on the first information, whether the first gesture is the preset gesture;
obtain second facial feature information of a second user;
determine, based on the second facial feature information, whether the second user is the first user; and
enable the first function when the first gesture is the preset gesture and the second user is the first user.

18. The computer program product of claim 17, wherein the computer-executable instructions further cause the electronic device to skip enabling the first function either when the first gesture is the preset gesture and the second user is not the first user or when the first gesture is not the preset gesture and the second user is the first user.

19. The computer program product of claim 17, wherein the computer-executable instructions further cause the electronic device to obtain the first information using a camera of the electronic device.

20. The computer program product of claim 17, wherein the computer-executable instructions further cause the electronic device to obtain the first information using an infrared sensor or a three-dimensional (3D) sensor of the electronic device.

\* \* \* \* \*